(12) United States Patent
Isoda et al.

(10) Patent No.: US 8,747,508 B2
(45) Date of Patent: Jun. 10, 2014

(54) HONEYCOMB FILTER AND MANUFACTURING METHOD OF THE SAME

(75) Inventors: Yoshinori Isoda, Nagoya (JP); Yoshio Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/420,774

(22) Filed: Mar. 15, 2012

(65) Prior Publication Data

US 2012/0240538 A1     Sep. 27, 2012

(30) Foreign Application Priority Data

Mar. 24, 2011   (JP) ................. 2011-065774

(51) Int. Cl.
| | |
|---|---|
| *B01D 39/00* | (2006.01) |
| *B01D 39/06* | (2006.01) |
| *B01D 39/14* | (2006.01) |
| *B01D 24/00* | (2006.01) |
| *B01D 50/00* | (2006.01) |

(52) U.S. Cl.
USPC ............. 55/523; 55/522; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182
See application file for complete search history.

(56) References Cited

U.S. PATENT DOCUMENTS

| | | | | |
|---|---|---|---|---|
| 5,198,007 | A * | 3/1993 | Moyer et al. | ............... 55/523 |
| 7,718,143 | B2 * | 5/2010 | Ogura | ................. 422/180 |
| 2008/0152863 | A1 | 6/2008 | Tomita et al. | |

| | | | |
|---|---|---|---|
| 2010/0135866 | A1 | 6/2010 | Mizuno et al. |
| 2012/0009092 | A1 | 1/2012 | Mizutani et al. |
| 2012/0009093 | A1 | 1/2012 | Mizutani et al. |

FOREIGN PATENT DOCUMENTS

| | | |
|---|---|---|
| EP | 1 939 261 A1 | 7/2008 |
| EP | 2 123 617 A1 | 11/2009 |
| JP | 2008-179526 A1 | 8/2008 |
| WO | 2008/136232 A1 | 11/2008 |
| WO | 2010/110010 A1 | 9/2010 |

OTHER PUBLICATIONS

Extended European Search Report dated Aug. 17, 2012.
Yukio Mizuno et al., "Study on Wall Pore Structure for Next Generation Diesel Particulate Filter," SAE Technical Paper 2008-01-0921,Society of Automotive Engineers, 2008, pp. 289-298.

(Continued)

*Primary Examiner* — Amber Orlando
(74) *Attorney, Agent, or Firm* — Burr & Brown, PLLC

(57) ABSTRACT

There is provided a honeycomb filter including: a honeycomb base material; plugged portions; and a porous collecting layer disposed on the surface of the partition wall parent material in at least the remaining cells. The collecting layer has a constitution in which a plurality of particles combine or intertwine with one another, and the collecting layer includes flat plate-like particles as the plurality of particles. The plurality of particles are particles in which an average long diameter is 0.2 μm or larger and smaller than 10 μm, an average value of ratios (long diameters/short diameters) of the long diameters to the short diameters of the respective particles is smaller than 3, and an average value of ratios (the long diameters/thicknesses) of the long diameters to thicknesses of the respective particles is 3 or larger. An open area ratio of the surface of the collecting layer is 10% or larger.

10 Claims, 10 Drawing Sheets

(56) References Cited

OTHER PUBLICATIONS

E. Ohara et al., "*Filtration Behavior of Diesel Particulate Filters (1),*" SAE Technical Paper 2007-01-0921, Society of Automotive Engineers, 2007, pp. 261-272.

U.S. Appl. No. 13/416,299, filed Mar. 9, 2012, Isoda et al.
U.S. Appl. No. 13/424,722, filed Mar. 20, 2012, Kikuchi et al.
U.S. Appl. No. 13/424,764, filed Mar. 20, 2012, Kikuchi et al.

* cited by examiner

HONEYCOMB FILTER AND MANUFACTURING METHOD OF THE SAME

BACKGROUND OF THE INVENTION

1. Field of the Invention

The present invention relates to a honeycomb filter, and a manufacturing method of the honeycomb filter. More particularly, it relates to a honeycomb filter which can suppress the increase of an initial pressure loss and also suppress the rise of a pressure loss when a particulate matter is deposited, and also relates to a manufacturing method of a honeycomb filter which can manufacture such a honeycomb filter.

2. Description of Related Art

In gases discharged from internal combustion engines such as diesel engines, various types of combustion apparatuses and the like, a large amount of particulate matter (PM) mainly composed of soot is included. When this PM is discharged as it is to the atmosphere, environmental pollutions are caused. Therefore, a diesel particulate filter (DPF) for collecting the PM is mounted on an exhaust system of an exhaust gas.

As such a DPF, there has been used, for example, a honeycomb structure "including porous partition walls arranged to partition a plurality of cells which become through channels of a fluid (an exhaust gas and a purified gas) and an outer peripheral wall positioned in an outermost periphery, and further including plugged portions in open frontal areas of predetermined cells in an end surface on an inflow side of the fluid (the exhaust gas) and open frontal areas of the remaining cells in an end surface on an outflow side of the fluid (the purified gas)".

There has been a problem that when the PM in the exhaust gas is collected by using such a honeycomb structure, the PM penetrates into the porous partition walls to clog pores of the partition walls, and a pressure loss rapidly increases sometimes.

A filter has been suggested in which to suppress the increase of a pressure loss, a collecting layer for collecting a PM is disposed on the surfaces of partition walls, and the collecting layer prevents the penetration of the PM into the partition walls, to suppress the rise of the pressure loss (e.g., see Non-Patent Document 1).

Heretofore, the regulation by means of a mass of the PM has been performed as a regulation on an automobile exhaust gas. In recent years, however, the introduction of the regulation on the number of the PMs has been investigated. In this case, it is necessary to securely collect the PM having small particle diameters. It is known that the PM having the small particle diameters is collected by the surfaces of pores which are present in a filter, mainly by diffusion (e.g., see Non-Patent Document 2).

Heretofore, when the honeycomb structure including the collecting layer is prepared, wet type coating has been performed by immersing the honeycomb structure into a collecting layer forming slurry (a collecting layer forming raw material) or pouring the collecting layer forming slurry into cells of the honeycomb structure, to coat porous partition walls (a partition wall parent material) with the collecting layer forming slurry, or dry type coating has been performed by sucking raw material powder together with air to coat the porous partition walls (the partition wall parent material) with particles, followed by firing, to form the collecting layer. Moreover, when a porous film having smaller pore diameters and smaller thickness than the porous partition walls is formed on the surfaces of the partition walls, it has been necessary to set the particle diameters of ceramic particles constituting the porous film to be smaller than the pore diameters of the partition walls. However, in this method, there has been a problem that the collecting layer forming slurry or the raw material powder penetrates into the pores of the partition walls (the partition wall parent material) of the honeycomb structure, and an initial pressure loss in the case of the circulation of the exhaust gas through the obtained honeycomb structure becomes high.

For example, as a manufacturing method of such a honeycomb structure, there has been suggested a method in which a collecting layer forming slurry prepared by further adding a pore former and water to the same material as that of a honeycomb formed body is sprayed on the honeycomb formed body, to deposit the collecting layer forming slurry on partition walls of the honeycomb formed body, followed by drying and firing, thereby disposing the collecting layer on the honeycomb formed body (e.g., see Patent Document 1).

Furthermore, there has been suggested a method in which a slurry made of a bonding material mainly composed of an inorganic fibrous material longer than pore diameters of porous partition walls and silica or alumina is deposited on the surfaces of the partition walls, followed by drying and firing, thereby forming a porous film (a collecting layer) on surface layers of the partition walls (e.g., see Patent Document 1 and Patent Document 2).

In addition, there has been suggested a method in which particles having an average particle diameter smaller than that of particles constituting partition walls are supplied through one opening end of a honeycomb fired body by a solid-gas two-phase flow, and the particles are deposited in open pores formed by the particles constituting the partition walls and/or spaces among the particles, in surface layer portions of the partition walls, to form a composite region (a collecting layer) (e.g., see Patent Document 2).

[Patent Document 1] WO2008/136232A1
[Patent Document 2] WO2010/110010A1
[Non-Patent Document 1] SAE Technical Paper 2008-01-0618, Society of Automotive Engineers (2008)
[Non-Patent Document 2] SAE Technical Paper 2007-01-0921, Society of Automotive Engineers (2007)

SUMMARY OF THE INVENTION

However, in the manufacturing method disclosed in Patent Document 1, a collecting layer is formed by using a collecting layer forming slurry including an inorganic fibrous material longer than pore diameters of partition walls. Such an inorganic fibrous material is an object substance of laws and regulations, depending upon the district, and hence it is desired that the inorganic fibrous material is not used. However, when spherical particles are used as described above, particles penetrate into the pores of the partition walls (a partition wall parent material) of a honeycomb structure, and an initial pressure loss of the honeycomb structure becomes high.

Moreover, in the manufacturing method disclosed in Patent Document 1, the collecting layer is formed by a wet type process such as spray coating or dip coating by use of a slurry including the inorganic fibrous material. Therefore, the inorganic fibrous materials constituting the collecting layer are aligned with each other, or the inorganic fibrous material and the partition walls (the partition wall parent material) are aligned, thereby decreasing through channels through which a gas and the like penetrate into the collecting layer. This has caused a problem that the pressure loss in an initial state of the obtained honeycomb structure increases. Moreover, such a honeycomb structure also has a problem that the rise of the pressure loss when a PM is deposited (especially, in a deposition initial stage where the PM starts to be deposited) becomes large.

Moreover, in the manufacturing method disclosed in Patent Document 2, particles are deposited in pores of partition walls, and hence through channels through which a gas penetrates into a composite region (a collecting layer) decrease. This has been a problem that a pressure loss in an initial state of an obtained honeycomb structure increases. Moreover, such a honeycomb structure also has a problem that the rise of a pressure loss when a PM is deposited (especially, in a deposition initial stage where the PM starts to be deposited) becomes large.

The present invention has been developed in view of the above problems, and an object thereof is to provide a honeycomb filter which can suppress the increase of an initial pressure loss and also suppress the rise of a pressure loss when a particulate matter is deposited, and a manufacturing method of a honeycomb filter which can manufacture such a honeycomb filter.

[1] A honeycomb filter comprising: a honeycomb base material including a porous partition wall parent material to partition and form a plurality of cells which become through channels of a fluid; plugged portions arranged in open frontal areas of predetermined cells in an end surface on an inflow side of the fluid and open frontal areas of the remaining cells in an end surface on an outflow side of the fluid; and a porous collecting layer disposed on the surface of the partition wall parent material in at least the remaining cells, wherein the collecting layer has a constitution in which a plurality of particles combine or intertwine with one another, the collecting layer includes flat plate-like particles as the plurality of particles, the plurality of particles are particles in which an average long diameter is 0.2 µm or larger and smaller than an average value of ratios (the long diameters/short diameters) of the long diameters to the short diameters of the respective particles is smaller than 3, and an average value of ratios (the long diameters/thicknesses) of the long diameters to the thicknesses of the respective particles is 3 or larger, and an open area ratio of the surface of the collecting layer is 10% or larger.

[2] The honeycomb filter according to the above [1], wherein the plurality of particles include 60% or more of specific plate-like particles having long diameters of 0.2 µm or larger and smaller than 10 ratios (the long diameters/the short diameters) of the long diameters to the short diameters which are smaller than 3, and ratios (the long diameters/the thicknesses) of the long diameters of the thicknesses which are 3 or larger, in the number of all the particles constituting the collecting layer.

[3] The honeycomb filter according to the above [1] or [2], wherein in the plurality of particles, a percentage of particles having the long diameters/the short diameters of 3 or larger and the long diameters/the thicknesses of 3 or larger in the number of all the particles constituting the collecting layer is smaller than 0.1%.

[4] The honeycomb filter according to any one of the above [1] to [3], wherein a porosity of the collecting layer is from 60 to 95%.

[5] The honeycomb filter according to any one of the above [1] to [4], wherein a thickness of the collecting layer is from 5 to 30% of a thickness of each of partition walls including the partition wall parent material and the collecting layer disposed on the partition wall parent material.

[6] The honeycomb filter according to any one of the above [1] to [5], wherein an average pore diameter of the collecting layer is from 0.5 to 5 µm.

[7] The honeycomb filter according to any one of the above [1] to [6], wherein in the honeycomb base material, an average pore diameter of the partition wall parent material is from 10 to 60 µm, and a porosity of the partition wall parent material is from 40 to 70%.

[8] The honeycomb filter according to any one of the above [1] to [7], wherein the plurality of particles are particles containing, as a main component, at least one selected from the group consisting of talc, kaolin, mica, alumina, silica, zirconia, titania, ceria, magnesia, cordierite, and mullite.

[9] The honeycomb filter according to any one of the above [1] to [8], wherein the plate-like particles include composite plate-like particles formed by coating at least one selected from the group consisting of plate-like ceramic particles, graphite, and glass flakes with ceramic particles or sol.

[10] The honeycomb filter according to any one of the above [1] to [9], wherein the collecting layer is also disposed on the surface of the partition wall parent material in the predetermined cells.

[11] A manufacturing method of a honeycomb filter, comprising: a collecting layer forming step of sucking powder including flat plate-like particles together with air through inflow-side end surfaces of remaining cells of a plugged honeycomb structure comprising a honeycomb base material including a porous partition wall parent material to partition and form a plurality of cells which become through channels of a fluid, and plugged portions arranged in open frontal areas of predetermined cells in an end surface on an inflow side of the fluid and open frontal areas of the remaining cells in an end surface on an outflow side of the fluid, attaching the powder to the surface of the partition wall parent material in the remaining cells, and firing the attached powder to form a collecting layer, wherein as the powder, there is used powder including particles having an average long diameter of 0.2 µm or larger and smaller than 10 an average value of ratios (the long diameters/short diameters) of the long diameters to the short diameters of the respective particles which is smaller than 3, and an average value of ratios (the long diameters/thicknesses) of the long diameters to the thicknesses of the respective particles which is 3 or larger, and in the used powder, a percentage of non plate-like particles having the long diameters which are smaller than a length of ⅕ of the average long diameter, and having the ratios (the long diameters/the thicknesses) of the long diameters to the thicknesses which is smaller than 2 in the number of all the particles constituting the powder is smaller than 10%.

[12] The manufacturing method of the honeycomb filter according to the above [11], wherein as the powder, there is used powder where a percentage of specific plate-like particles having long diameters of 0.2 µm or larger and smaller than 10 µm, the ratios (the long diameters/the short diameters) of the long diameters to the short diameters which are smaller than 3, and the ratios (the long diameters/the thicknesses) of the long diameters to the thicknesses which are 3 or larger in the number of all the particles constituting the powder is 60% or larger.

[13] The manufacturing method of the honeycomb filter according to the above [11] or [12], wherein as the powder, there is used powder where a percentage of particles having the ratios (the long diameters/the short diameters) of the long diameters to the short diameters which are 3 or larger, and the ratios (the long diameters/the thicknesses) of the long diameters to the thicknesses which are 3 or larger in the number of all the particles constituting the powder is smaller than 0.1%.

In a honeycomb filter of the present invention, a porous collecting layer is disposed on the surface of a partition wall parent material in at least remaining cells. Moreover, the collecting layer has a constitution in which a plurality of particles combine or intertwine with one another. Furthermore, the collecting layer includes flat plate-like particles as the plurality of particles. The plurality of particles are particles in which an average long diameter is 0.2 μm or larger and smaller than 10 μm, an average value of ratios (long diameters/short diameters) of the long diameters to the short diameters of the respective particles is smaller than 3, and an average value of ratios (the long diameters/thicknesses) of the long diameters to the thicknesses of the respective particles is 3 or larger, and an open area ratio of the surface of the collecting layer is 10% or larger. Therefore, it is possible to suppress the increase of an initial pressure loss of the honeycomb filter, and it is also possible to suppress the rise of a pressure loss when a particulate matter is deposited. In particular, the collecting layer of the honeycomb filter of the present invention has a constitution in which the above plurality of particles combine or intertwine with one another in a state where the particles are not excessively aligned along the surface of the partition wall parent material. In consequence, the above high open area ratio is realized.

Moreover, a manufacturing method of a honeycomb filter according to the present invention "comprises a collecting layer forming step of sucking powder including flat plate-like particles together with air through inflow-side end surfaces of remaining cells of a plugged honeycomb structure, and attaching the powder to the surface of the partition wall parent material in the remaining cells, wherein as the powder, there is used powder including particles having an average long diameter of 0.2 μm or larger and smaller than 10 μm, an average value of ratios (the long diameters/short diameters) of the long diameters to the short diameters of the respective particles which is smaller than 3, and an average value of ratios (the long diameters/thicknesses) of the long diameters to the thicknesses of the respective particles which is 3 or larger, and in the used powder, a percentage of non plate-like particles having the long diameters which are smaller than a length of ⅕ of the average long diameter, and having the long diameters/the thicknesses smaller than 2 in the number of all the particles constituting the powder is smaller than 10%". In consequence, the collecting layer can be formed of the plate-like particles sucked together with the air so that the plate-like particles are not excessively aligned with one another or the particles are not excessively aligned on the surface of the partition wall parent material. Therefore, it is possible to easily manufacture a honeycomb filter in which it is possible to lower an initial pressure loss and to suppress the rise of a pressure loss when a particulate matter is deposited.

DETAILED DESCRIPTION OF THE INVENTION

Hereinafter, embodiments of the present invention will specifically be described with reference to the drawings, but it should be understood that the present invention is not limited to the following embodiments and that the following embodiments to which changes, improvements and the like are suitably added on the basis of ordinary knowledge of a person skilled in the art without departing from the scope of the present invention also fall in the scope of the present invention.

Figure 1:
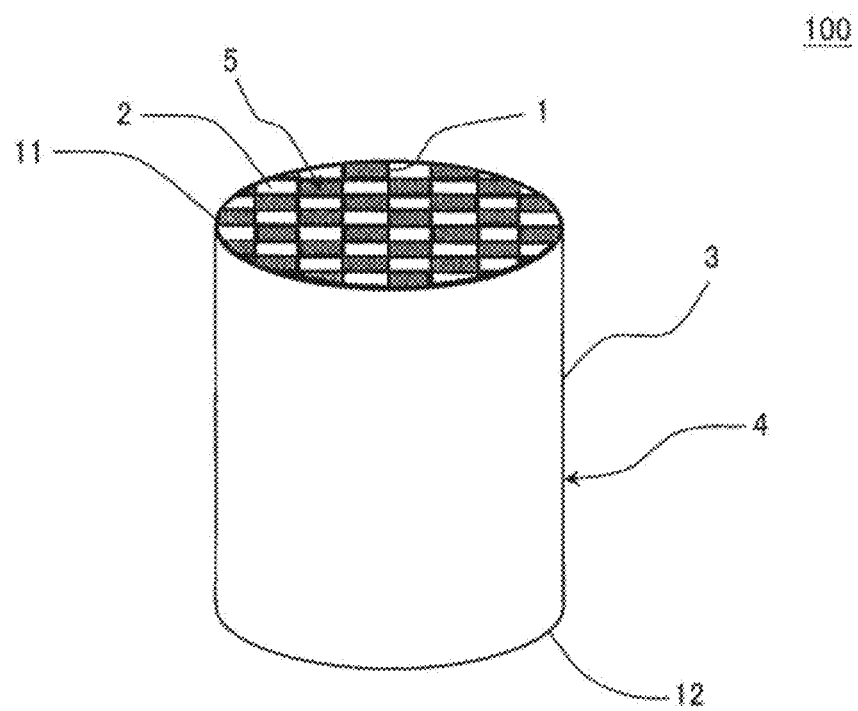
FIG. 1 is a perspective view schematically showing an embodiment of a honeycomb filter of the present invention.
Figure 2:
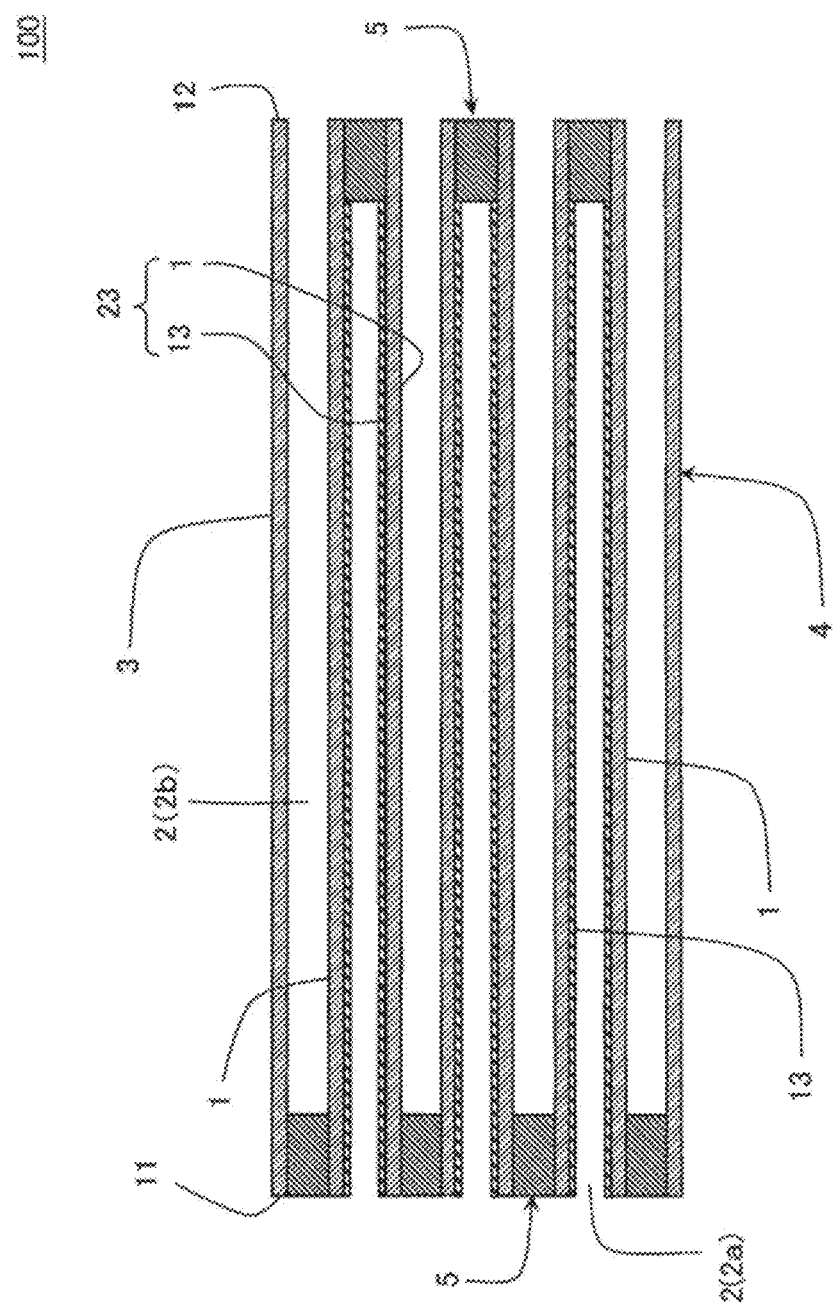
FIG. 2 is a schematic view showing a cross section of the embodiment of the honeycomb filter of the present invention which is parallel to a cell extending direction.
Figure 3:
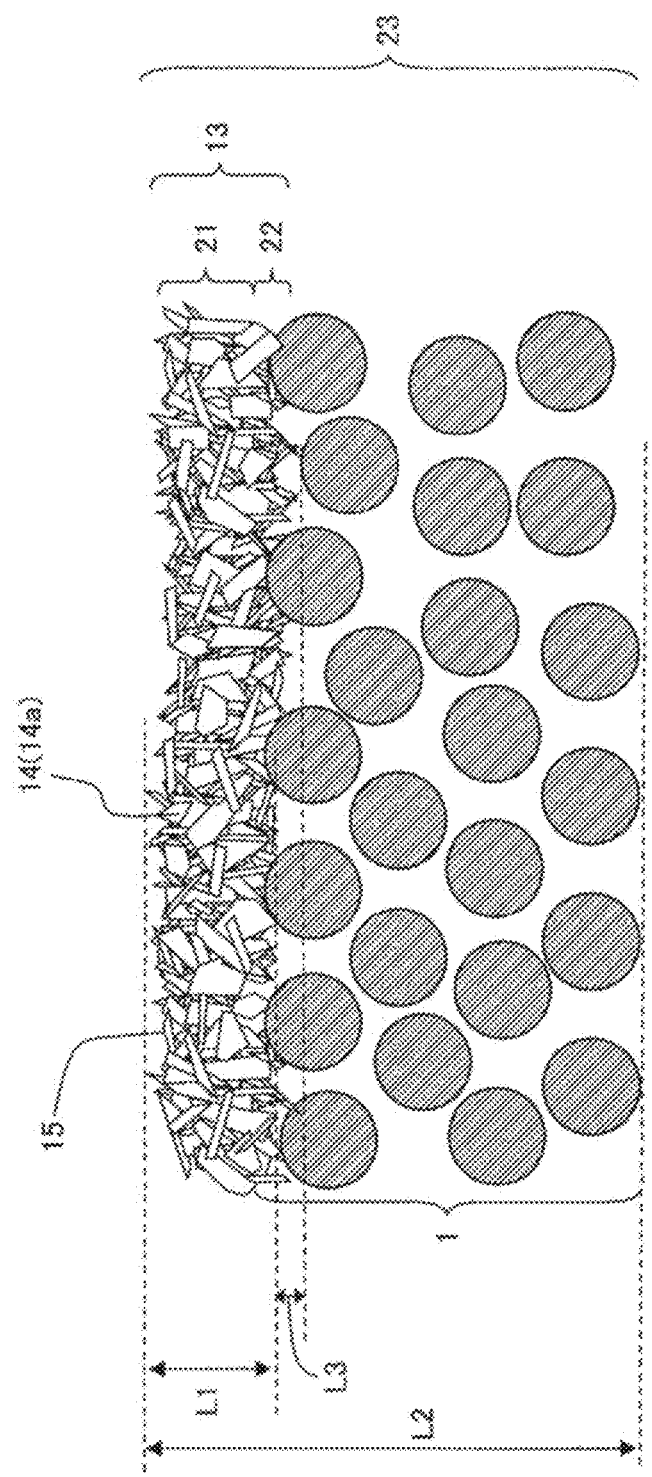
FIG. 3 is an enlarged schematic view showing a cross section of a partition wall in the embodiment of the honeycomb filter of the present invention.

(1) Honeycomb Filter:

As shown in FIG. 1 to FIG. 3, an embodiment (a honeycomb filter 100) of a honeycomb filter of the present invention is the honeycomb filter 100 including a honeycomb base material 4 having a porous partition wall parent material 1 to partition and form a plurality of cells 2 which become through channels of a fluid; plugged portions 5 arranged in open frontal areas of predetermined cells 2 (outflow cells 2b) in an end surface 11 on an inflow side of the fluid and open frontal areas of the remaining cells 2 (inflow cells 2a) in an end surface 12 on an outflow side of the fluid; and a porous collecting layer 13 disposed on the surface of the partition wall parent material 1 in the remaining cells 2 (the inflow cells 2a).

Moreover, the collecting layer 13 of the honeycomb filter 100 of the present embodiment has a constitution in which a plurality of particles 14 combine or intertwine with one another. Moreover, the collecting layer 13 includes, as the plurality of particles, flat plate-like particles. The plurality of particles are particles in which an average long diameter is 0.2 μm or larger and smaller than 10 μm, an average value of ratios (hereinafter referred to as "the long diameters/short diameters" sometimes) of the long diameters to the short diameters of the respective particles is smaller than 3, and an average value of ratios (hereinafter referred to as "the long diameters/the thicknesses" sometimes) of the long diameters to the thicknesses of the respective particles is 3 or larger. Furthermore, an open area ratio of a surface 15 of the collecting layer 13 is 10% or larger.

According to this constitution, the honeycomb filter 100 of the present embodiment can suppress the increase of an initial pressure loss, and can also suppress the rise of a pressure loss when a particulate matter is deposited on the surface 15 of the collecting layer 13. In particular, when the respective average values of "the lengths of the long diameters", "the long diameters/the short diameters" and "the long diameters/the thicknesses" of the particles constituting the collecting layer 13 are in the above ranges, the plate-like particles constituting the collecting layer do not easily penetrate into pores of the partition wall parent material. Moreover, even when the particles penetrate into the pores, the particles do not easily clog the pores. Therefore, it is possible to suitably suppress the rise of an initial pressure loss of the honeycomb filter. In particular, the collecting layer 13 has a constitution in which plate-like particles 14a combine or intertwine with one another in a state where the particles are not excessively aligned along the surface of the partition wall parent material 1, whereby a high open area ratio (i.e., the open area ratio of 10% or larger) is realized.

In the honeycomb filter 100 of the present embodiment, the collecting layer 13 may be disposed on the surface of the partition wall parent material 1 in the outflow cells 2b. Moreover, "the end surface" of the honeycomb base material means a surface in which the cells are open. Moreover, partition walls 23 are formed by disposing the collecting layer 13 on the partition wall parent material 1. That is, a combination of the partition wall parent material 1 and the collecting layer 13 forms the partition walls 23. FIG. 1 is a perspective view schematically showing the embodiment of the honeycomb filter of the present invention. FIG. 2 is a schematic view showing a cross section parallel to a cell extending direction in the embodiment of the honeycomb filter of the present invention. FIG. 3 is an enlarged schematic view showing a cross section of one of the partition walls in the embodiment of the honeycomb filter of the present invention.

Figure 4A:
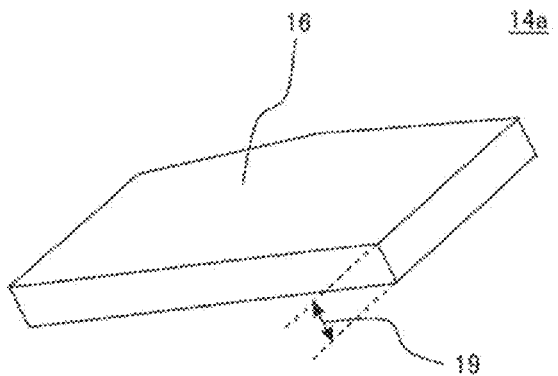
FIG. 4A is a perspective view showing an example of a plate-like particle constituting a collecting layer in the embodiment of the honeycomb filter of the present invention.
Figure 4B:
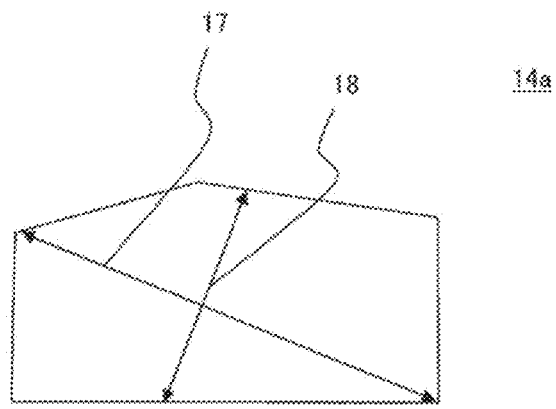
FIG. 4B is a plan view showing the example of the plate-like particle constituting the collecting layer in the embodiment of the honeycomb filter of the present invention.

As shown in FIG. 4A and FIG. 4B, each of "the plate-like particles 14a" means a short and thin piece-like particle in which a length in a thickness direction (a thickness 19 of the plate-like particle) is smaller than a length of a long diameter 17. It is to be noted that "thin piece-like" means a shape having two or more comparatively flat surfaces 16, and two of the flat surfaces 16 are substantially parallel, and have two-dimensional spread. A distance between the substantially parallel surfaces 16 (the length in the thickness direction (i.e., the thickness)) is comparatively small as compared with the long diameters 17 of the surfaces. That is, rod-like particles having a large length in a uniaxial direction (in other words, the rod-like particles which do not have any flat surface) are not included in the thin piece-like plate-like particles. FIG. 4A is a perspective view showing an example of the plate-like particle constituting the collecting layer in the embodiment of the honeycomb filter of the present invention. FIG. 4B is a plan view showing the example of the plate-like particle constituting the collecting layer in the embodiment of the honeycomb filter of the present invention.

The plate-like particle 14a shown in FIG. 4A and FIG. 4B has the long diameter 17 long in one direction, and a short diameter 18 short in another direction in the surface 16 thereof. Moreover, the "length of the long diameter" means a length of a portion passing through the gravity center of the plate-like particle and having the longest diameter in a direction parallel to the surface of the plate-like particle. The "length of the short diameter" means a length of a length passing through the gravity center of the plate-like particle and having a direction orthogonal to the long diameter in the direction parallel to the surface of the plate-like particle. On the other hand, "the length in the thickness direction" of the plate-like particle means a length of the shortest portion in the direction orthogonal to the length of the long diameter. It is to be noted that "the length of the long diameter of the plate-like particle" will be referred to simply as "the long diameter of the plate-like particle". "The length of the short diameter of the plate-like particle" will be referred to simply as "the short diameter of the plate-like particle". "The length of the plate-like particle in the thickness direction" will be referred to simply as "the thickness of the plate-like particle".

Moreover, as to the particles constituting the collecting layer (e.g., the plate-like particles), the particles combine with one another at contact points thereof sometimes. However, even when the particles combine with one another, bonded particles are considered to be separate particles (i.e., individual particles prior to bonding are the separate particles).

In the honeycomb filter of the present embodiment, the particles constituting the collecting layer are particles in which an average long diameter is 0.2 µm or larger and smaller than 10 µm, an average value of "the long diameters/the short diameters" of the respective particles is smaller than 3, and an average value of "the long diameters/the thicknesses" of the respective particles is 3 or larger. That is, there is not any special restrictions on the particles constituting the collecting layer, as long as the average value of the long diameters (the average long diameter), the average value of "the long diameters/the short diameters" and the average value of "the long diameters/the thicknesses" are satisfied. For example, all the particles may be the above plate-like particles, or a mixture of the plate-like particles and particles such as spherical, fibrous or pillar-like (rod-like) particles. However, from the viewpoint of suppressing the increase of the initial pressure loss, the spherical particles preferably are not included. Moreover, the fibrous particles and pillar-like particles become object substances of laws and regulations, and hence the fibrous particles and the pillar-like particles preferably are not included.

In the honeycomb filter of the present embodiment, the long diameters, the short diameters and the thicknesses of the particles constituting the collecting layer can be measured by a scanning type electron microscope (SEM) image of the particles peeled from the surface of the collecting layer. Specifically, the particles constituting the collecting layer are peeled from the surface of the collecting layer with a cellophane tape, to obtain the SEM image of the particles. From the image obtained in this manner, the long diameters, the short diameters and the thicknesses of the respective particles can be measured. As to the plate-like particles in the particles, the length of the portion of each plate-like particle passing through the gravity center thereof and having the longest diameter in the direction parallel to the surface of the plate-like particle is "the long diameter of the plate-like particle", the length passing through the gravity center of the plate-like particle and having the direction orthogonal to the long diameter is "the short diameter of the plate-like particle", and a length of a thickness portion of the plate-like particle in a direction vertical to the surface of the plate-like particle is "the thickness of the plate-like particle". Moreover, when a spherical or elliptic particle is included as the particle in the particles, among lengths of diameters in three directions orthogonal to one another, the length of the longest diameter is "the long diameter of the particle", the length of the secondly long diameter is "the short diameter of the particle", and the length of the shortest diameter is "the thickness of the particle". The average value (a mean) of the long diameters is "the average long diameter", the average value (the mean) of the long diameters/the short diameters of the respective particles is "the average value of the long diameters/the short diameters" and the average value (the mean) of the long diameters/the thicknesses of the respective particles is "the average value of the long diameters/the short diameters".

When the average long diameter of the particles constituting the collecting layer is smaller than 0.2 µm, pore diameters of the collecting layer tend to be reduced, and the initial pressure loss becomes high. Moreover, when the average long diameter is over 10 µm, the plate-like particles tend to be easily aligned in a plane direction (the direction parallel to the surface), and the initial pressure loss becomes high. The average long diameter is preferably from 0.2 to 8 µm, further preferably from 0.5 to 5 µm, and especially preferably from 0.5 to 3 µm. When the average long diameter is in the above range, it is possible to suitably suppress the rise of the initial pressure loss.

When the average value of the ratios (the long diameters/the short diameters) of the long diameters to the short diameters of the particles constituting the collecting layer is 3 or larger, more fibrous or pillar-like particles are substantially included. In the honeycomb filter of the present embodiment, the particles preferably include more plate-like particles. In other words, the fibrous or pillar-like particles are preferably included as little as possible. The use of the fibrous or pillar-like particles is limited by the laws and regulations sometimes. When the average value of the values of the long diameters/the short diameters is smaller than 3, the honeycomb filter of the present embodiment can be prevented from becoming the object of the laws and regulations.

When the average value of the values of the ratios (the long diameters/the thicknesses) of the long diameters to the thicknesses of the particles constituting the collecting layer is smaller than 3, a porosity of the collecting layer tends to decrease, and the initial pressure loss becomes high.

In the honeycomb filter of the present embodiment, the plurality of particles preferably include 60% or more of specific plate-like particles having long diameters of 0.2 µm or larger and smaller than 10 µm, the long diameters/the short diameters smaller than 3, and the long diameters/the thicknesses of 3 or larger, in the number of all the particles constituting the collecting layer. According to such a constitution, it is possible to suitably suppress the increase of the initial pressure loss, and it is also possible to suitably suppress the rise of the pressure loss when the particulate matter is deposited.

An average value of the ratios (the long diameters/the thicknesses) of the long diameters to the thicknesses of the plate-like particles is preferably from 3 to 50, further preferably from 5 to 50, and especially preferably from 10 to 50. When the ratios (the long diameters/the thicknesses) of the long diameters to the thicknesses of the plate-like particles are in the above range, it is possible to form the collecting layer having a high porosity.

The collecting layer preferably includes 60% or more of the specific plate-like particles in the number of all the particles constituting the collecting layer. When the percentage of the specific plate-like particles is smaller than 60%, the number of the plate-like particles decreases, the pores of the partition wall parent material are easily clogged with the particles, and the porosity tends to lower. In consequence, the initial pressure loss becomes high.

The percentage of the specific plate-like particles in the number of all the particles (hereinafter referred to simply as "the percentage of the specific plate-like particles" sometimes) can be calculated by measuring the number of all the particles and the number of the specific plate-like particles from the scanning type electron microscope (SEM) image of the particles peeled from the surface of the collecting layer. Specifically, the particles constituting the collecting layer are peeled from the surface of the collecting layer with the cellophane tape, to obtain the SEM image of the particles. Next, it is judged whether or not the particles in the obtained image correspond to the specific plate-like particles, and the number of the specific plate-like particles and the number of all the particles including the specific plate-like particles are measured. Afterward, a percentage of the number of the specific plate-like particles to the number of all the particles (the number of the specific plate-like particles/the number of all the particles×100) is obtained as "the percentage (%) of the specific plate-like particles".

The percentage of the specific plate-like particles is preferably from 70 to 100%, further preferably from 80 to 100%, and especially preferably from 90 to 100%. According to such a constitution, it is possible to form the collecting layer having a higher porosity.

In the honeycomb filter of the present embodiment, the open area ratio of the surface of the collecting layer is 10% or larger. When the open area ratio of the surface of the collecting layer is 10% or larger, the flow of the particulate matter included in an exhaust gas can be dispersed, and pores of the collecting layer can effectively be prevented from being clogged with the particulate matter. In the honeycomb filter of the present embodiment, it is possible to suppress the rise of the pressure loss when the particulate matter is deposited.

"The open area ratio of the surface of the collecting layer" means a ratio of an area of a part where a substantive part of the collecting layer is not present and the pores are actually open in the surface (the flat surface) of the collecting layer, with respect to the surface (the flat surface). Specifically, "the open area ratio of the surface of the collecting layer" can be obtained by the following method. First, an image of the surface of the collecting layer is picked up by using a laser microscope (e.g., "LEXT OLS4000 (trade name)" manufactured by OLYMPUS Co.), and a surface unevenness image of the surface is acquired. Next, a surface undulation of the surface unevenness image is removed by high pass filter ($\lambda$=25 µm) processing, and then binarization processing is performed by using "(a mode value of a height)−2 µm" as a threshold value. After the binarization processing, a region higher than the above threshold value is obtained as a partition wall material (i.e., the substantive part of the collecting layer), and a lower region is obtained as a pore part of the collecting layer. The areas of the substantive part of the collecting layer and the pore part of the collecting layer are calculated, respectively. From the obtained areas, the ratio of a pore area to the whole area (the pore area/the whole area×100) is obtained as "the open area ratio (%) of the surface of the collecting layer".

The open area ratio of the surface of the collecting layer is preferably from 10 to 50%, and further preferably from 20 to 40%. When the open area ratio of the surface of the collecting layer is in the above range, it is possible to more suitably suppress the rise of the pressure loss when the particulate matter is deposited. When the open area ratio of the surface of the collecting layer is over 50%, a collecting efficiency of the particulate matter by the collecting layer lowers, and the rise of the pressure loss when the particulate matter is deposited becomes large sometimes.

The porosity of the collecting layer is preferably 60 to 95%, further preferably from 70 to 95%, and especially preferably from 75 to 95%. When the porosity is in the above range, it is possible to suitably suppress the initial pressure loss.

A method of measuring the porosity of the collecting layer is as follows. The honeycomb filter is first buried in a resin (an epoxy resin) to fill pores of partition walls of the honeycomb filter with the resin. A scanning type electron microscope (SEM) image of a cross section of the honeycomb filter having the pores filled with the resin which is in a vertical direction to a cell longitudinal direction is acquired. A partition wall in the obtained SEM image is divided by a width of 5 μm from a partition wall center (the center in a thickness direction) to a surface layer in the image (by image analysis), and each "divided part (divided region)" is subjected to the following processing. An area of the partition walls of each divided part is measured by using image analysis software ("Image-Pro Plus 6.2J (trade name)" manufactured by Media Cybernetics Co.). Here, a value obtained by subtracting "the area of the partition walls" from "the whole area" becomes "the area of pores (fine pores)". In the image of the divided part closest to the surface, a percentage of "the area of the pores (the fine pores)" to "the whole area" (i.e., {1−"the area of the partition walls"/"the whole area"}×100) is obtained as "the porosity (%) of the collecting layer".

A thickness of the collecting layer is preferably from 5 to 30% of that of each of the partition walls (i.e., the partition wall including the partition wall parent material and the collecting layer disposed on the partition wall parent material). When the thickness of the collecting layer is smaller than 5% of that of the partition wall, an effect produced by disposing the collecting layer is not easily developed, and hence the rise of the pressure loss when the particulate matter is deposited cannot suitably be suppressed sometimes. That is, when the particulate matter in the exhaust gas is collected, the particulate matter penetrates into the porous partition walls to clog the pores of the partition walls, and the pressure loss increases sometimes. Moreover, when the thickness of the collecting layer is over 30% of that of the partition wall, the collecting layer becomes excessively thick, and the initial pressure loss becomes high sometimes.

A ratio of the thickness of the collecting layer to the thickness of the partition wall varies in accordance with the open area ratio, the porosity or the like of the collecting layer, but the ratio is further preferably from 5 to 20%, and especially preferably from 5 to 15%. According to such a constitution, it is possible to have a good balance between suppressing the rise of the initial pressure loss and the rise of the pressure loss when the particulate matter is deposited.

The thickness of the collecting layer can be calculated on the basis of the porosity in each image divided by the width of 5 μm in the above method of measuring the porosity of the collecting layer. Specifically, an average value of "the porosity in the partition wall center" and "the porosity in the divided part of the partition wall which is closest to the surface (the collecting layer)" is calculated. Then, a distance to the surface of the partition wall from a part from which an image where the calculated average value becomes equal to the porosity is picked up can be obtained as the thickness of the collecting layer (e.g., a thickness L1 of the collecting layer shown in FIG. 3). Moreover, the thickness of the partition wall can be obtained as the thickness of all the partition walls including the partition wall parent material and the collecting layer disposed on the partition wall parent material (e.g., a thickness L2 of the partition wall shown in FIG. 3). The thickness (L2) of the partition wall can be obtained by the scanning type electron microscope (SEM) image of a partition wall cross section.

The thickness of the collecting layer can be specified as described above. However, as shown in FIG. 3, the actual collecting layer 13 in the honeycomb filter 100 of the present embodiment is constituted of a surface layer 21 positioned on an outer side from the surface of the partition wall parent material 1, and a deep layer 22 positioned on an inner side (inside the pores) from the surface of the partition wall parent material 1. That is, the partition wall 23 is constituted of the partition wall parent material 1 and the collecting layer 13, and a region where the partition wall parent material 1 is disposed partially overlaps with a region where the collecting layer 13 is disposed sometimes. In other words, part of the collecting layer 13 enters the pores of the partition wall parent material 1 to share the region sometimes. In particular, in the honeycomb filter of the present embodiment, the plate-like particles constituting the collecting layer combine or intertwine with one another in a state where the particles are not excessively aligned along the surface of the partition wall parent material (i.e., a state where the plate-like particles are not arranged in parallel with the surface of the partition wall parent material). Therefore, part of the plate-like particles or another particle enters the pores of the partition wall parent material 1 sometimes. The deep layer 22 which has entered the pores of the partition wall parent material 1 is also part of the collecting layer. However, when the thickness of the collecting layer is measured, the thickness of the collecting layer is measured by the above method. Moreover, the porosity measured by the above "method of measuring the porosity of the collecting layer" means that the porosity of the surface layer 21 is substantially measured.

An average pore diameter of the collecting layer (specifically, the average pore diameter of the surface layer) is preferably from 0.5 to 5 μm, further preferably from 1.5 to 4 μm, and especially preferably from 2 to 3.5 μm. When the average pore diameter of the collecting layer is smaller than 0.5 μm, the initial pressure loss becomes high sometimes. When the average pore diameter of the collecting layer is over 5 μm, the effect produced by disposing the collecting layer cannot easily be developed, and the rise of the pressure loss when the particulate matter is deposited cannot suitably be suppressed sometimes.

The average pore diameter of the collecting layer is a value measured by a bubble point/half dry process (ASTM E1294-89). Specifically, a partition wall part (a plate part) of a honeycomb base material (which is not provided with the collecting layer) for use in the honeycomb filter is cut so that the surface of the part has a size of 30 mm×30 mm. On the surface of one side of the cutout plate, a precursor of the collecting layer having a thickness of 10 to 30 μm is formed, by using the same material as a material constituting the collecting layer of the honeycomb filter. The precursor of the collecting layer is fired together with the cutout plate, to prepare an evaluation sample for measuring the average pore diameter. The average pore diameter of this evaluation sample is measured by the bubble point/half dry process by use of Perm Porometer ("Capillary Flow Porometer (trade name)" manufactured by PMI Co.).

In the honeycomb filter 100 of the present embodiment, a thickness of the part (the deep layer 22 (see FIG. 3)) of the collecting layer 13 which penetrates into the pores of the partition wall parent material 1 is 6% or smaller of the thickness of the partition wall 23, preferably 3% or smaller, and further preferably 1% or smaller. In consequence, when the thickness of the deep layer 22 (see FIG. 3) is 6% or smaller of that of the partition wall 23, it is possible to suppress the increase of the initial pressure loss. The thickness of the deep layer 22 (see FIG. 3) is preferably smaller, but a lower limit value is about 0.1%. The thickness of the partition wall 23 is a value measured by the scanning type electron microscope (SEM) image of the partition wall cross section.

The thickness of the deep layer of the collecting layer can be calculated on the basis of the porosity of each image divided by the width of 5 μm in the method of measuring the porosity of the collecting layer. Specifically, the average value of "the porosity in the partition wall center" and "the porosity in the divided part of the partition wall which is closest to the surface (the collecting layer)" is calculated. Then, a distance from the part from which the image where the average value calculated in this manner becomes equal to the porosity is picked up to "the divided part farthest from the surface where a mixture of the partition wall and the collecting layer is present (i.e., the deepest portion of the region where the mixture of the deep layer 22 and the partition wall parent material 1 is present)" can be obtained as the thickness of the deep layer (e.g., a thickness L3 of the deep layer shown in FIG. 3).

In the partition wall parent material 1 of the honeycomb filter 100 of the present embodiment, the average pore diameter is preferably from 10 to 60 μm, and the porosity is preferably from 40 to 70%. The average pore diameter is further preferably from 20 to 50 μm, and the porosity is further preferably from 50 to 65%. The average pore diameter is especially preferably from 20 to 30 μm and the porosity is especially preferably from 55 to 65%. When the average pore diameter is smaller than 10 μm or the porosity is smaller than 40%, the initial pressure loss becomes high sometimes. Moreover, when the average pore diameter is larger than 60 μm or the porosity is larger than 70%, a strength of the honeycomb filter lowers sometimes. The average pore diameter is a value measured with a mercury porosimeter. The porosity is a value measured with the mercury porosimeter.

A thickness of the partition wall parent material 1 is preferably from 100 to 500 μm, further preferably from 200 to 400 μm, and especially preferably from 300 to 350 μm. When the thickness is smaller than 100 μm, the strength of the honeycomb filter lowers sometimes. When the thickness is larger than 500 μm, the initial pressure loss becomes high sometimes.

In the honeycomb filter 100 of the present embodiment, there are not any special restrictions on a shape of the honeycomb base material 4. For example, a cylindrical shape, a tubular shape with an elliptical end surface, a polygonal pillar-like shape with "a square, rectangular, triangular, pentangular, hexagonal, octagonal or other" end surface and the like are preferable. In the honeycomb filter 100 shown in FIG. 1 and FIG. 2, the shape is the cylindrical shape. Moreover, the honeycomb filter 100 shown in FIG. 1 and FIG. 2 includes an outer peripheral wall 3, but does not have to include the outer peripheral wall 3. The outer peripheral wall 3 is preferably formed together with the partition wall parent material, when a honeycomb formed body is formed by extrusion in a process of preparing the honeycomb filter (in other words, a honeycomb structure). Moreover, the outer peripheral wall 3 may be formed by coating the outer periphery of the honeycomb structure with a ceramic material.

In the honeycomb filter 100 of the present embodiment, a material of the honeycomb base material 4 is preferably a ceramic. Owing to excellent strength and heat resistance, at least one selected from the group consisting of cordierite, silicon carbide, a silicon-silicon carbide composite material, mullite, alumina, aluminum titanate, silicon nitride, and a silicon carbide-cordierite composite material is further preferable. Among these materials, cordierite is especially preferable.

In the honeycomb filter 100 of the present embodiment, there are not any special restrictions on a cell shape of the honeycomb base material 4 (the cell shape in a cross section of the honeycomb filter which is orthogonal to a central axis direction (a cell extending direction)). Examples of cell shapes include a triangular shape, a quadrangular shape, a hexagonal shape, an octagonal shape, a round shape, and combinations of these shapes. As the quadrangular shape, a square shape or a rectangular shape is preferable.

In the honeycomb filter 100 of the present embodiment, there is not any special restrictions on a cell density of the honeycomb base material 4, but the cell density is preferably from 16 to 96 cells/cm$^2$, and further preferably from 32 to 64 cells/cm$^2$. When the cell density is smaller than 16 cells/cm$^2$, the area of the partition walls to collect the particulate matter becomes small. When the exhaust gas is circulated, the pressure loss becomes large in a short time sometimes. When the cell density is larger than 96 cells/cm$^2$, a cell sectional area (the area of a cross section orthogonal to the cell extending direction) becomes small. Therefore, the pressure loss becomes large sometimes.

In the honeycomb filter 100 of the present embodiment, examples of a material of the collecting layer 13 include ceramics and metals. More specifically, particles constituting the collecting layer are preferably particles containing, as a main component, at least one selected from the group consisting of talc, kaolin, mica, alumina, silica, zirconia, titania, ceria, magnesia, cordierite, and mullite. For example, when the particles constituting the collecting layer include the plate-like particles and non plate-like particles such as the spherical particles, these particles are further preferably particles containing at least one selected from the above group as the main component.

Moreover, the plate-like particles may include composite plate-like particles formed by coating at least one selected from the group consisting of plate-like ceramic particles, graphite, and glass flakes with ceramic particles or sol. For example, when the composite particles formed by coating graphite with the ceramic particles or sol are used, it is possible to suitably control the shape of the plate-like particles. Moreover, when the plate-like ceramic particles are coated, an acid resistance can be enhanced. In consequence, when the composite plate-like particles formed by coating the plate-like particles as described above are used, various characteristics, which cannot easily be developed by single plate-like particles, can be imparted to the collecting layer.

Moreover, the coating particles or sol may include a catalyst component. For example, when the ceramic particles are coated with the sol including the catalyst component, an oxidation speed of the particulate matter (PM) on the surfaces of the plate-like particles can be raised. Moreover, only the collecting layer is coated with the catalyst, and hence the amount of the catalyst to be used can be decreased. Furthermore, the collecting layer of the honeycomb filter of the present embodiment is formed so that the plate-like particles are not excessively aligned with one another. Therefore, the PM easily comes in contact with the plate-like particles, and a raising effect of the PM oxidation speed is large.

Moreover, in the honeycomb filter 100 of the present embodiment, a material of the partition wall parent material 1 is preferably cordierite, and the material of the collecting layer 13 is preferably a material containing at least one selected from the group consisting of alumina, talc, kaolin, and the composite plate-like particles.

When the exhaust gas including the particulate matter is treated by using a conventional honeycomb structure as the filter, which is not provided with the collecting layer, the particulate matter penetrates into the pores of the partition walls to clog the pores, resulting in a problem where the pressure loss rapidly rises. On the other hand, in the honeycomb filter of the present embodiment, the collecting layer is formed on the surfaces of the partition walls in the inflow cells. Therefore, according to the honeycomb filter of the present embodiment, the particulate matter is collected by the collecting layer, and can be prevented from penetrating into the pores of the partition walls, and as a result it is possible to suppress the rapid rise of the pressure loss.

Moreover, in the honeycomb filter 100 shown in FIG. 1 and FIG. 2, an example in which the collecting layer 13 is disposed only on the surface of the partition wall parent material 1 in the inflow cells 2a is shown. However, the collecting layer 13 may further be disposed on the surface of the partition wall parent material 1 in the outflow cells 2b. When the collecting layer 13 is further disposed on the surface of the partition wall parent material 1 in the outflow cells 2b, the collecting efficiency of the particulate matter can be enhanced. On the other hand, when the collecting layer 13 is disposed only on the surface of the partition wall parent material 1 in the inflow cells 2a, it is possible to suppress the excessive rise of the initial pressure loss.

(2) Manufacturing Method of Honeycomb Filter:

An embodiment of a manufacturing method of the honeycomb filter of the present invention is a manufacturing method of a honeycomb filter, including a collecting layer forming step of sucking powder including flat plate-like particles together with air through inflow-side end surfaces of remaining cells of a plugged honeycomb structure including a honeycomb base material including a porous partition wall parent material to partition and form a plurality of cells which become through channels of a fluid, and plugged portions arranged in open frontal areas of predetermined cells in an end surface on an inflow side of the fluid and open frontal areas of the remaining cells in an end surface on an outflow side of the fluid, attaching the powder to the surface of the partition wall parent material in the remaining cells, and firing the attached powder to form a collecting layer. As the powder, there is used powder including particles in which an average long diameter is 0.2 µm or larger and smaller than 10 µm, an average value of ratios (long diameters/short diameters) of long diameters to short diameters of the respective particles is smaller than 3, and an average value of ratios (the long diameters/thicknesses) of the long diameters to thicknesses of the respective particles is 3 or larger. In the used powder, a percentage of non plate-like particles having the long diameters which are smaller than a length of ⅕ of the average long diameter, and having the ratios (the long diameters/the thicknesses) of the long diameters to the thicknesses which is smaller than 2 in the number of all the particles constituting the powder is smaller than 10%.

In the collecting layer forming step of the manufacturing method of the honeycomb filter of the present embodiment, a percentage of "the non plate-like particles having the long diameters smaller than a length of ⅕ of the average long diameter of all the particles and having "the long diameters/the thicknesses" smaller than 2" is smaller than 10% of all the particles (the number of all the particles) which form the collecting layer. In consequence, the ratio of the plate-like particles is relatively increased. Furthermore, when a coating method by a dry process "of sucking the powder together with the air" as described above (a method of depositing the particles by the dry process) is employed, it is possible to simply and inexpensively obtain "the honeycomb filter where the collecting layer includes the particles having an average long diameter of 0.2 µm or larger and smaller than 10 µm, an average value of the long diameters/the short diameters of the respective particles which is smaller than 3, and an average value of the long diameters/the thicknesses of the respective particles which is 3 or larger and where the open area ratio of the surface of this collecting layer is 10% or larger" (the above honeycomb filter of the present invention).

In a conventional honeycomb filter manufacturing method, a collecting layer is formed by using fibrous particles, but such fibrous particles become object substances of laws and regulations depending upon the district. Therefore, it is desirable to suppress the use of the particles as much as possible. In the manufacturing method of the honeycomb filter of the present embodiment, it is possible to manufacture the honeycomb filter having a low initial pressure loss by use of the plate-like particles which do not become the object substances of the laws and regulations. Moreover, when the fibrous particles are used in the conventional manufacturing method, the collecting layer is formed by a wet process such as spray coating or dip coating. Therefore, the fiber particles are aligned with one another or the fiber particles and the partition wall parent material are aligned (in other words, the fiber particles are arranged in parallel along the surface of the partition wall parent material), and through channels through which a gas and the like penetrate into the collecting layer (i.e., the open area ratio of the surface of the collecting layer) decrease.

In the manufacturing method of the honeycomb filter of the present embodiment, the particles are deposited by a dry process (a method of conveying dry particles together with air) by use of particles in which a percentage of the non plate-like particles is smaller than 10%. Therefore, the plate-like particles are not easily aligned, and spaces among the particles deposited on the surface of the partition wall parent material can be increased. When the percentage of the non plate-like particles is over 10%, small spherical particles relatively increase. The spherical particles penetrate into the pores of the partition wall parent material, to clog the pores. In consequence, the initial pressure loss of the obtained honeycomb filter increases. That is, when "the powder including the particles having an average long diameter of 0.2 µm or larger and smaller than 10 µm, the average value of the ratios (the long diameters/the short diameters) of the long diameters to the short diameters of the respective particles which is smaller than 3, and the average value of the ratios (the long diameters/the thicknesses) of the long diameters to the thicknesses of the respective particles is 3 or larger" is simply used as the powder, it is difficult to form the collecting layer having a lowered pressure loss. It becomes important to use the powder in which the ratio of the non plate-like particles is smaller than 10% and to form the collecting layer by the above dry process.

Hereinafter, each step of the manufacturing method of the honeycomb filter of the present embodiment will be described.

Figure 5:
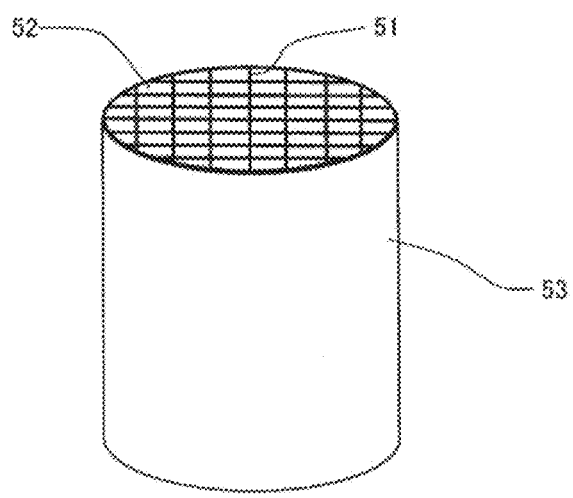
FIG. 5 is a perspective view schematically showing a honeycomb formed body prepared in a forming step of an embodiment of a manufacturing method of a honeycomb filter according to the present invention.
Figure 6:
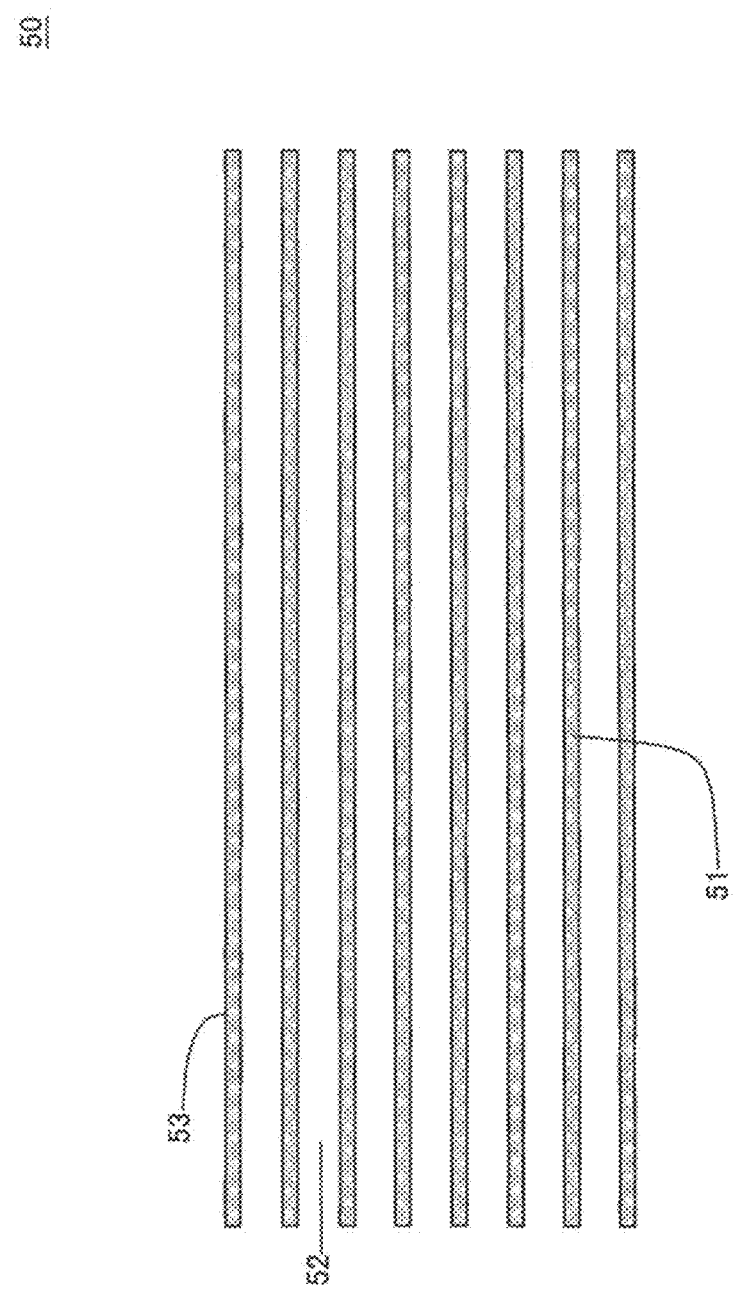
FIG. 6 is a schematic view showing a cross section of a honeycomb formed body prepared in the forming step of the embodiment of the manufacturing method of the honeycomb filter according to the present invention, which is parallel to a cell extending direction.

(2-1) Preparation of Honeycomb Base Material (Forming Step):

First, in a forming step, a ceramic forming raw material containing a ceramic raw material is formed into a honeycomb formed body (the formed body of a honeycomb configuration) 50 including a non-fired partition wall parent material 51 to partition and form a plurality of cells 52 which become through channels of a fluid as shown in FIG. 5 and FIG. 6. FIG. 5 is a perspective view schematically showing the honeycomb formed body 50 prepared in the forming step of the embodiment of the manufacturing method of the honeycomb filter according to the present invention. The honeycomb formed body 50 shown in FIG. 5 and FIG. 6 includes an outer peripheral wall 53. FIG. 6 is a schematic view showing a cross section of the honeycomb formed body 50 prepared in the forming step of the embodiment of the manufacturing method of the honeycomb filter according to the present invention, which is parallel to an extending direction of the cells 52.

The ceramic raw material contained in the ceramic forming raw material is preferably at least one selected from the group consisting of a cordierite forming raw material, cordierite, silicon carbide, a silicon-silicon carbide composite material, mullite, alumina, aluminum titanate, silicon nitride, and a silicon carbide-cordierite composite material. It is to be noted that the cordierite forming raw material is a ceramic raw material blended to obtain a chemical composition in a range in which silica is from 42 to 56 mass %, alumina is from 30 to 45 mass %, and magnesia is from 12 to 16 mass %, and the raw material is fired to become cordierite.

Moreover, this ceramic forming raw material is preferably prepared by mixing the above ceramic raw material with a dispersion medium, an organic binder, an inorganic binder, a pore former, a surfactant and the like. There is not any special restriction on composition ratios of the respective raw materials, and the composition ratios are preferably set in accordance with a configuration, a material and the like of a honeycomb structure to be prepared.

To regulate a pore surface area, average pore diameter and porosity of the partition wall parent material of the honeycomb filter to be prepared, the respective raw materials are further preferably regulated as follows.

As the ceramic raw material, talc, kaolin, alumina and silica are preferably used. An average particle diameter of talc is preferably from 10 to 30 µm. An average particle diameter of kaolin is preferably from 1 to 10 µm. An average particle diameter of alumina is preferably from 1 to 20 µm. An average particle diameter of silica is preferably from 1 to 60 µm. Moreover, as the pore former, starch, carbon, resin balloon, polymethyl methacrylate (PMMA), a water absorbing resin or a combination of them is preferably used. Moreover, an average particle diameter of the pore former is preferably from 10 to 100 µm. Furthermore, an amount of the pore former to be added is preferably from 0.5 to 10 parts by mass with respect to 100 parts by mass of the ceramic raw material. Moreover, as the organic binder, methylcellulose, hydroxypropyl methylcellulose, hydroxypropyl ethylcellulose, hydroxyethylcellulose, carboxymethylcellulose, polyvinyl alcohol, or a combination of them is preferably used. Furthermore, an amount of the organic binder to be added is preferably from 1 to 10 parts by mass with respect to 100 parts by mass of the ceramic raw material.

When the ceramic forming raw material is formed, the ceramic forming raw material is first kneaded to form a kneaded material, and the obtained kneaded material is preferably formed in a honeycomb shape. There is not any special restriction on a method of kneading the ceramic forming raw material to form the kneaded material, and examples of the method include methods using a kneader, a vacuum clay kneader and the like. There is not any special restriction on a method of forming the kneaded material into the honeycomb formed body, and a known forming method such as extrusion-forming or injection-forming can be used. Preferable examples of the method include a method of extruding the kneaded material to form the honeycomb formed body by use of a die having a desirable cell shape, partition wall thickness and cell density. As a material of the die, a hard metal which is not easily worn is preferable.

There is not any special restriction on the shape of the honeycomb formed body. A cylindrical shape shown in FIG. 5, a tubular shape with an elliptical end surface, a polygonal pillar-like shape with "a square, rectangular, triangular, pentangular, hexagonal, octagonal or other" end surface and the like are preferable.

Moreover, after the above forming, the obtained honeycomb formed body may be dried. There is not any special restriction on a drying method, but examples of the method include hot air drying, microwave drying, dielectric drying, reduced pressure drying, vacuum drying, and freeze drying. Above all, dielectric drying, microwave drying or the hot air drying is preferably performed alone or as a combination of them.

Figure 7:
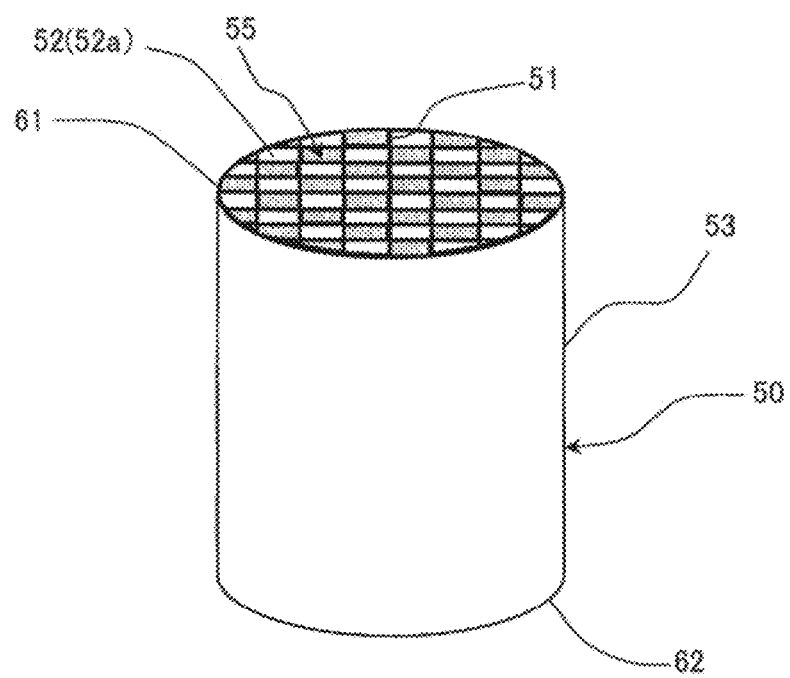
FIG. 7 is a perspective view schematically showing a plugged honeycomb formed body prepared in a plugging step of the embodiment of the manufacturing method of the honeycomb filter according to the present invention.
Figure 8:
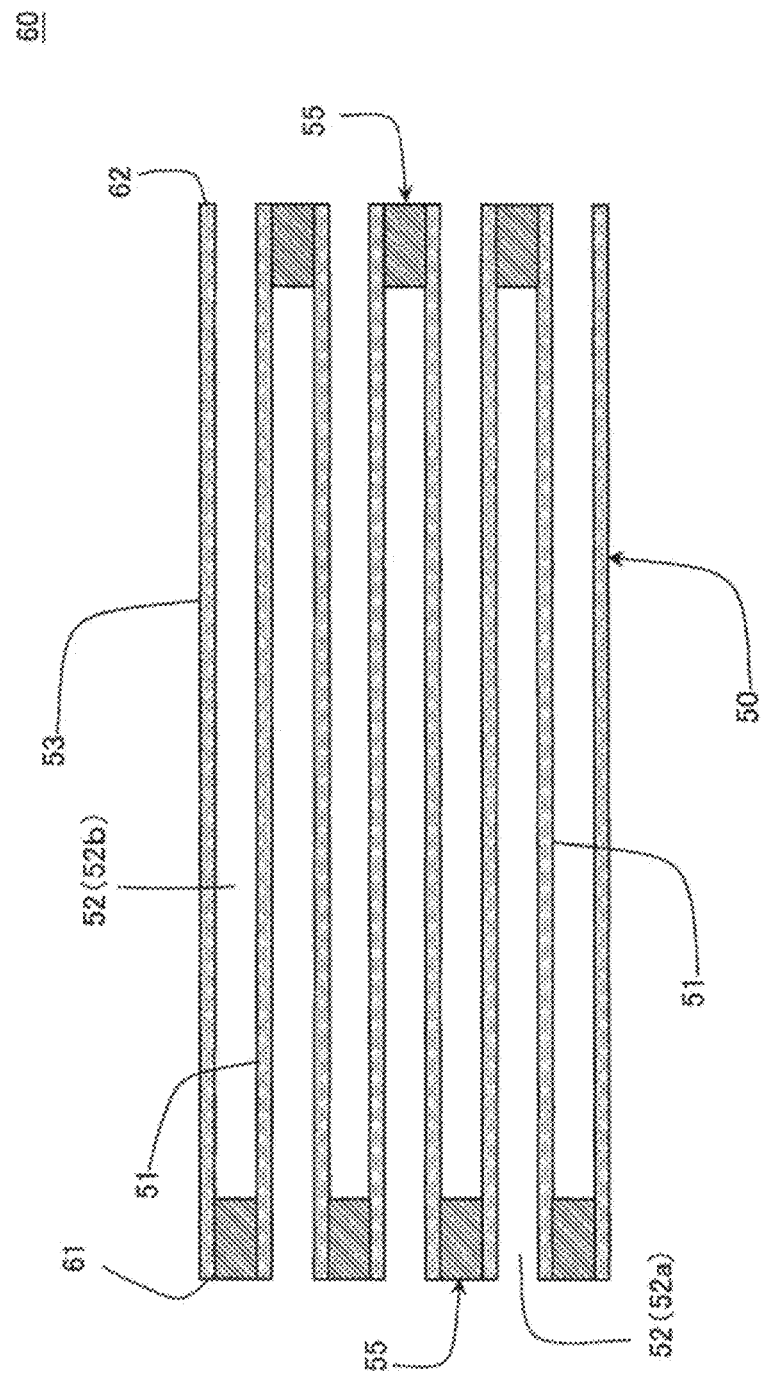
FIG. 8 is a schematic view showing a cross section of the plugged honeycomb formed body prepared in the plugging step of the embodiment of the manufacturing method of the honeycomb filter according to the present invention, which is parallel to the cell extending direction.

(2-2) Plugging Step:

In a plugging step after the forming step, as shown in FIG. 7 and FIG. 8, plugged portions 55 are arranged in open frontal areas of the predetermined cells 52 (outflow cells 52*b*) in an end surface 61 on an inflow side of a fluid and open frontal areas of the remaining cells 52 (inflow cells 52*a*) in an end surface 62 on an outflow side of the fluid in the honeycomb formed body 50. The plugged portions 55 are arranged in the honeycomb formed body 50 to form a plugged honeycomb formed body 60. FIG. 7 is a perspective view schematically showing the plugged honeycomb formed body 60 prepared in the plugging step of the embodiment of the manufacturing method of the honeycomb filter according to the present invention. FIG. 8 is a schematic view showing a cross section of the plugged honeycomb formed body 60 prepared in the plugging step of the embodiment of the manufacturing method of the honeycomb filter according to the present invention, which is parallel to the extending direction of the cells 52.

When the honeycomb formed body is charged with a plugging material, the end surface side on the inflow side of the fluid and the end surface side on the outflow side of the fluid are alternately charged with the plugging material. Examples of a method of charging the body with the plugging material include a method including a masking step of attaching a sheet to one end surface of the honeycomb formed body to make holes at positions which overlap with "the cells to be provided with the plugged portions" in the sheet, and a pressure pouring step of placing, under pressure, "the end of the honeycomb formed body to which the sheet is attached" into a container in which the plugging material is stored, to pour, under pressure, the plugging material into the cells of the honeycomb formed body. When the plugging material is poured under pressure into the cells of the honeycomb formed body, the plugging material passes through the holes formed in the sheet to charge, with the material, only the cells which communicate with the holes formed in the sheet.

The plugging material can be prepared by suitably mixing raw materials as examples of constitutional elements of the ceramic forming raw material. The ceramic raw material contained in the plugging material is preferably the same as that for use as a raw material of the partition wall parent material.

In the plugged honeycomb formed body 60 shown in FIG. 7 and FIG. 8, the inflow cells 52*a* and the outflow cells 52*b* are preferably alternately arranged so that the plugged portions 55 and the open frontal areas of the cells 52 form a checkered pattern in the end surface (e.g., the inflow-side end surface 61) provided with the plugged portions.

Next, the plugging material with which the honeycomb formed body is charged is preferably dried.

Figure 9:
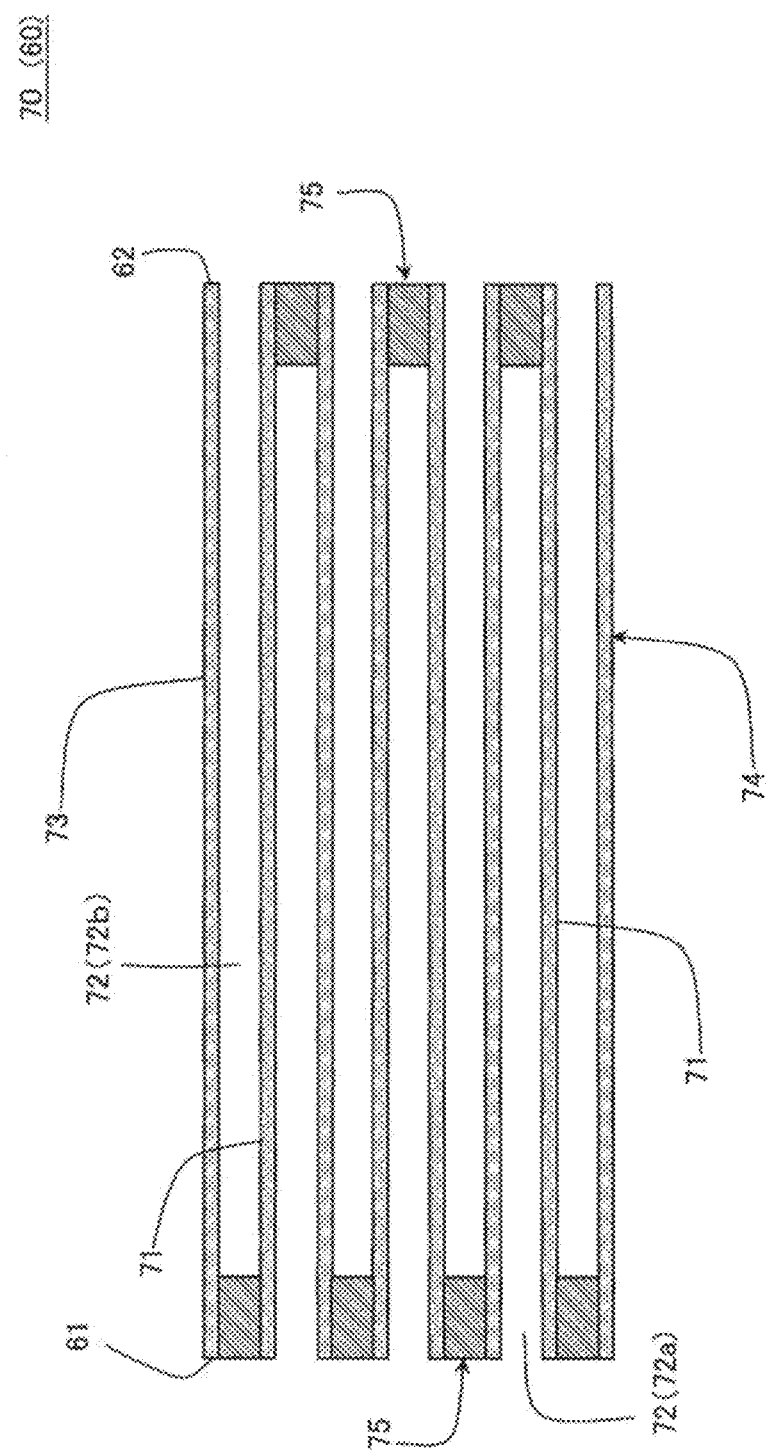
FIG. 9 is a schematic view showing a cross section of a plugged honeycomb structure for use in the embodiment of the manufacturing method of the honeycomb filter according to the present invention, which is parallel to the cell extending direction.

(2-3) Preparation of Plugged Honeycomb Structure (Firing Step 1):

Next, as shown in FIG. 9, the plugged honeycomb formed body 60 charged with the plugging material is fired to prepare a plugged honeycomb structure 70. The plugged honeycomb structure 70 is the plugged honeycomb structure 70 including a honeycomb base material 74 having a porous partition wall parent material 71 to partition and form a plurality of cells which become through channels of a fluid; and plugged portions 75 arranged in open frontal areas of predetermined cells 72 (outflow cells 72b) in the end surface 61 on the inflow side of the fluid and open frontal areas of the remaining cells 72 (inflow cells 72a) in the end surface 62 on the outflow side of the fluid. FIG. 9 is a schematic view showing a cross section of the plugged honeycomb structure for use in the embodiment of the manufacturing method of the honeycomb filter according to the present invention, which is parallel to the cell extending direction. Moreover, the plugged honeycomb structure 70 shown in FIG. 9 includes an outer peripheral wall 73.

Prior to firing (final firing) the plugged honeycomb formed body, the plugged honeycomb formed body is preferably calcinated, where calcinating is performed for degreasing. There is not any special restriction on a calcinating method, as long as organic matter (an organic binder, a surfactant, a pore former, etc.) in the plugged honeycomb formed body is removed. In general, a burning temperature of the organic binder is from about 100 to 300° C., and a burning temperature of the pore former is from about 200 to 800° C. Therefore, calcinating conditions preferably include heating performed in an oxidation atmosphere at about 200 to 1000° C. for 3 to 100 hours.

The firing (final firing) of the plugged honeycomb formed body is performed to sinter and densify the forming raw material constituting the calcinated formed body, thereby acquiring a predetermined strength. Firing conditions (temperature, time, and atmosphere) vary in accordance with a type of the forming raw material, and hence adequate conditions may be selected in accordance with the type. For example, when the cordierite forming raw material is used, the firing temperature is preferably from 1410 to 1440° C. Moreover, the firing time is preferably from 4 to 8 hours at maximum temperature. There is not any special restriction on an apparatus which performs the calcinating and the final firing, but an electric furnace, a gas furnace or the like can be used.

Figure 10:
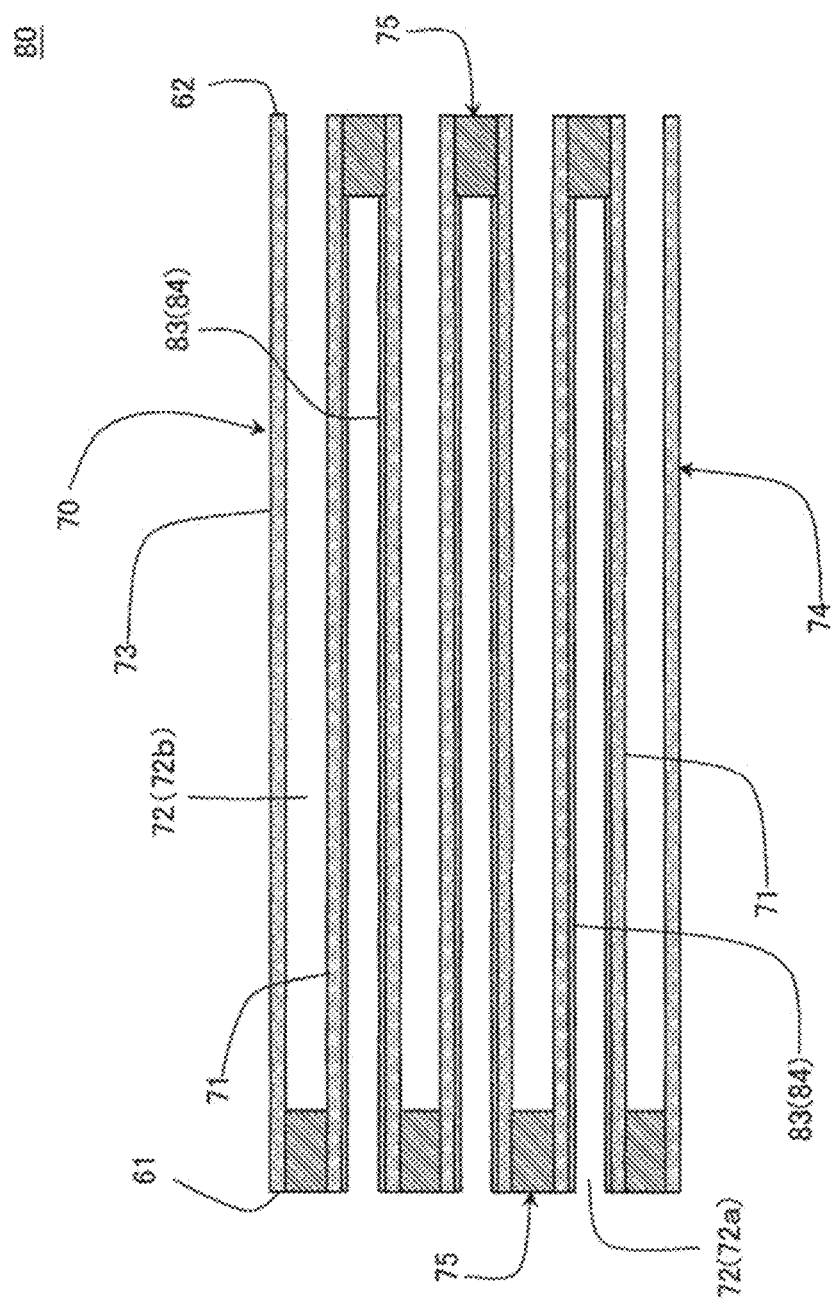
FIG. 10 is a schematic view showing a cross section of the plugged honeycomb structure provided with a non-fired collecting layer prepared in a collecting layer forming step of the embodiment of the manufacturing method of the honeycomb filter according to the present invention, which is parallel to the cell extending direction.

(2-4) Collecting Layer Forming Step 1 (Preparation of Non-Fired Collecting Layer):

Next, as shown in FIG. 10, powder 84 including plate-like particles is sucked together with air through the inflow-side end surface 62 of the remaining cells 72 of the obtained plugged honeycomb structure 70, and the powder 84 is attached to the surface of the partition wall parent material 71 in the remaining cells 72, to prepare a plugged honeycomb structure 80 provided with a non-fired collecting layer. Particles in the powder 84 are deposited on the surface of the partition wall parent material 71, to form the non-fired collecting layer (a non-fired collecting layer 83). FIG. 10 is a schematic view showing a cross section of the plugged honeycomb structure provided with the non-fired collecting layer prepared in a collecting layer forming step of the embodiment of the manufacturing method of the honeycomb filter according to the present invention, which is parallel to the cell extending direction. In the collecting layer forming step, the collecting layer is formed by a dry process of sucking the particles together with the air, and hence the powder 84 attached to the surface of the partition wall parent material 71 is not easily aligned in one direction.

In the manufacturing method of the honeycomb filter of the present embodiment, as the powder 84, there is used powder where a percentage of non plate-like particles having the long diameters which are smaller than a length of ⅕ of the average long diameter of all the particles, and having the ratios (the long diameters/the thicknesses) of the long diameters to the thicknesses of the particles that are smaller than 2 present in an amount smaller than 10%.

The average long diameter of the particles of the powder which becomes the raw material of the collecting layer is an average value (a mean) of "the lengths of the respective particles in a direction parallel to a flat surface" in an SEM image of the raw material powder. It is to be noted that the long diameters, the short diameters and the thicknesses of the particles of the powder which become the raw material can be measured in conformity with the method of measuring the long diameters, the short diameters and the thicknesses of the particles constituting the collecting layer.

The long diameter is "the length of the longest diameter" among lengths of diameters of three directions of each particle which are orthogonal to one another in the SEM image. The ratio of the long diameter to the short diameter of each particle in the powder (i.e., "the long diameter/the short diameter") is a ratio of "the long diameter" to the short diameter (the length of the second longest diameter among the lengths of the diameters of the three directions orthogonal to the long diameter and also to one another) obtained from the SEM image of the raw material powder. Moreover, the ratio (i.e., "the long diameter/the thickness") of the long diameter to the thickness of each particle in the powder is the ratio of "the long diameter" to the thickness (the length of the shortest diameter among the lengths of the three orthogonal directions) obtained from the SEM image of the raw material powder.

A percentage of the non plate-like particles is a percentage obtained by multiplying, by 100, a value obtained by dividing, by the number of all the particles, the number of "the particles having the ratios (the long diameters/the thicknesses) of the long diameters to the thicknesses of the particles which are smaller than 2 and having small particle long diameters when the length of ⅕ of the average long diameter is compared with the long diameter of each particle".

The percentage of the non plate-like particles may be smaller than 10%, but is preferably from 0 to 9%, further preferably from 0 to 7%, and especially preferably from 0 to 5%. In the manufacturing method of the honeycomb filter of the present embodiment, the above non plate-like particles most preferably are not substantially contained in the powder which becomes the raw material.

Moreover, the powder which becomes the raw material of the collecting layer includes at least the plate-like particles, and this powder is powder including particles having an average long diameter of 0.2 μm or larger and smaller than 10 μm, an average value of the ratios (the long diameters/the short diameters) of the respective particles which is smaller than 3, and an average value of "the long diameters/the thicknesses" which is 3 or larger. The percentage of the non plate-like particles may be smaller than 10%. However, as the powder, there is preferably used the powder where a percentage of specific plate-like particles having long diameters of 0.2 μm or larger and smaller than 10 μm, "the long diameters/the short diameters" smaller than 3, "the long diameters/the thicknesses" of 3 or larger in the number of all the particles constituting the powder is 60% or larger. According to such a constitution, it is possible to suitably manufacture the honeycomb filter of the present invention.

Moreover, as the powder, there is more preferably used the powder where a percentage of the particles in which the ratios (the long diameters/the short diameters) of the long diameters to the short diameters are 3 or larger and the ratios (the long diameters/the thicknesses) of the long diameters to the thicknesses are 3 or larger in the number of all the particles constituting the powder is smaller than 0.1%. According to such a constitution, fibrous or rod-like particles remarkably decrease.

The particles constituting the powder which becomes the raw material of the collecting layer are preferably particles containing, as a main component, at least one selected from the group consisting of talc, kaolin, mica, alumina, silica, zirconia, titania, ceria, magnesia, cordierite, and mullite.

Moreover, the particles other than the non plate-like particles preferably include composite plate-like particles formed by coating at least one selected from the group consisting of plate-like ceramic particles, graphite, and glass flakes with ceramic particles or sol.

There is not any special restriction on conditions for sucking the powder including the plate-like particles together with the air to form the non-fired collecting layer, and an amount of the powder and an amount of the air can be regulated in consideration of the thickness of the collecting layer to be formed and the like. For example, as specific conditions for sucking the powder together with the air, a density of the powder in the air is preferably from 1 to 10 mg/cc. An air sucking speed is preferably from 0.1 to 5 m/s. Moreover, it is possible to control the porosity of the obtained collecting layer in accordance with a clogging degree of the particles.

(2-5) Collecting Layer Forming Step 2 (Manufacturing of Honeycomb Filter (Firing Step 2)):

Next, the obtained plugged honeycomb structure 70 is fired to prepare the honeycomb filter 100 (see FIG. 1 and FIG. 2) (firing step 2). In firing step 2, the non-fired collecting layer 83 (i.e., the powder attached to the surface of the partition wall parent material) is fired to form the collecting layer 13 (see FIG. 2) having a constitution in which the plurality of particles 84 combine or intertwine with one another.

Firing conditions (temperature, time, and atmosphere) of firing step 2 vary in accordance with the type of raw material particles of the collecting layer, and hence adequate conditions may be selected in accordance with the type. For example, when cordierite is used in the base material and alumina is used in the collecting layer material, the firing temperature is preferably from 1000 to 1300° C. Moreover, the firing time is preferably from 0 to 2 hours at maximum temperature. There are no special restrictions on an apparatus which performs the firing, but an electric furnace, a gas furnace or the like can be used. In the manufacturing method of the honeycomb filter of the present embodiment, the collecting layer is formed by the dry process, and hence the particles in a dry state adhere on the surface of the partition wall parent material. Therefore, the manufacturing method has advantages that prior to firing step 2, a step of drying the particles which form the collecting layer is not required and that there is no fear that film cracks and the like are generated at the time of drying. For example, when the body is coated with the particles which form the collecting layer in a slurried state (i.e., in the case of the wet process), the drying step becomes an essential step, and manufacturing steps become intricate. Moreover, a problem of the generation of the film cracks or the like also occurs.

EXAMPLES

Hereinafter, the honeycomb structure and the manufacturing method of the honeycomb structure of the present invention will further specifically be described with respect to examples. However, the present invention is not limited to these examples.

Example 1

As a ceramic raw material, a cordierite forming raw material (talc, kaolin and alumina) was used. A mass ratio of talc, kaolin and alumina was a mass ratio at which cordierite was obtained after firing. In 100 parts by mass of the ceramic raw material, 4 parts by mass of binder (methylcellulose) and 35 parts by mass of water were mixed to obtain a ceramic forming raw material. The obtained ceramic forming raw material was kneaded by using a kneader, to obtain a kneaded material. The obtained kneaded material was extruded by using a vacuum extrusion-forming machine, to obtain a honeycomb formed body. In the obtained honeycomb formed body, a partition wall thickness was 304.8 μm, a cell density was 46.5 cells/cm$^2$, and the whole shape was a cylindrical shape (a diameter of an end surface was 127 mm, and a length in a cell extending direction was 152.4 mm). As a cell shape, a shape orthogonal to the cell extending direction was a square. The obtained honeycomb formed body was dried with microwaves and hot air.

Next, part of open frontal areas of a plurality of cells in end surfaces (the end surfaces on an inflow side and an outflow side) of the honeycomb formed body was masked. At this time, the cells provided with the mask and the cells which were not provided with the mask were alternately arranged. Moreover, the end of the body on a masked side was immersed into a plugging slurry containing a cordierite forming raw material, to charge, with the plugging slurry, the open frontal areas of the cells which were not provided with the mask. In consequence, a plugged honeycomb formed body was obtained in which plugged portions were arranged in the open frontal areas of the predetermined cells in the inflow-side end surface and the open frontal areas of the remaining cells in the outflow-side end surface.

Next, the plugged honeycomb formed body was heated at 450° C. for five hours, and degreased. Furthermore, the body was fired by heating the body at 1425° C. for seven hours, to obtain a plugged honeycomb structure.

As a raw material for forming a collecting layer (the collecting layer raw material powder), particles of alumina (the alumina particles) were sucked together with air through one end surface of the plugged honeycomb structure, and attached to the surface of a partition wall parent material in the cells (inflow cells) of the plugged honeycomb structure.

As conditions for sucking the alumina particles, a density of the powder in the air was 5 mg/cc, and an air sucking speed was 1 m/s.

As the alumina particles, there were used particles where a percentage of non plate-like particles having long diameters smaller than a length of ⅕ of an average particle long diameter of all the particles and having long diameters/thicknesses of the particles smaller than 2 was 5%. That is, 95% of the particles were particles in which long diameters were equal to or larger than the length of ⅕ of the average particle long diameter of all the particles or the long diameters/the thicknesses were 2 or larger.

The average long diameter of the raw material powder (e.g., the alumina particles) and the long diameters of the respective particles were measured by the following methods. The following methods are methods of measuring the average long diameter in a state of the raw material powder and the long diameters of the respective particles.

(Long Diameters of Particles)

An SEM image of raw material powder was picked up, and "a length of the longest diameter" was measured among lengths of diameters of each particle in this image in three directions orthogonal to one another. Such lengths were obtained as "the long diameters of the respective particles".

(Average Long Diameter of Raw Material)

An average (mean) value of the long diameters of the respective particles measured as described in the above (Long Diameters of Particles) was obtained as "the average long diameter".

Moreover, the short diameters, the thicknesses, "the long diameters/the short diameters" and "the long diameters/the thicknesses" of the respective particles were measured by the following methods.

(Short Diameters and Thicknesses of Particles)

An SEM image of raw material powder was picked up, and "the length of the longest diameter" was obtained as "the long diameter" among the lengths of the diameters of each particle in this image in three directions orthogonal to one another. Then, "the length of the secondly long diameter" was measured as "the short diameter" among the lengths of the diameters of the three directions. Furthermore, "the length of the shortest diameter" was measured as "the thickness" among the lengths of the diameters of the three directions.

("Long Diameters/Short Diameters" and "Long Diameters/Thicknesses" of Particles)

Ratios (the long diameters/the short diameters) of the long diameters to the short diameters of the respective particles and ratios (the long diameters/the thicknesses) of the long diameters to the thicknesses of the respective particles were calculated from "the long diameters of the respective particles", "the short diameters of the particles" and "the thicknesses of the particles" measured as described in the above (Long Diameters of Particles) and (Short Diameters and Thicknesses of Particles).

"The average value of the long diameters/the short diameters" and "the average value of the long diameters/the thicknesses" of the raw material powder were measured by the following methods.

("Average Value of Long Diameters/Short Diameters" and "Average Value of Long Diameters/Thicknesses" of Raw Material Powder)

The average (mean) values of the values of the ratios measured as described in the above ("Long Diameters/Short Diameters" and "Long Diameters/Thicknesses" of Particles) were obtained as "the average value of the long diameters/the short diameters" and "the average value of the long diameters/the thicknesses", respectively.

Next, the plugged honeycomb structure to which the alumina particles were attached (the plugged honeycomb structure with a non-fired collecting layer) was heated at 1000 to 1300° C. for two hours to perform firing, thereby obtaining a honeycomb filter. The obtained honeycomb filter included a honeycomb base material including a porous partition wall parent material to partition and form a plurality of cells which became through channels of a fluid; plugged portions arranged in open frontal areas of predetermined cells in an end surface on an inflow side of the fluid and open frontal areas of the remaining cells in an end surface on an outflow side of the fluid; and a porous collecting layer disposed on the surface of the partition wall parent material in the remaining cells.

Figure 11:
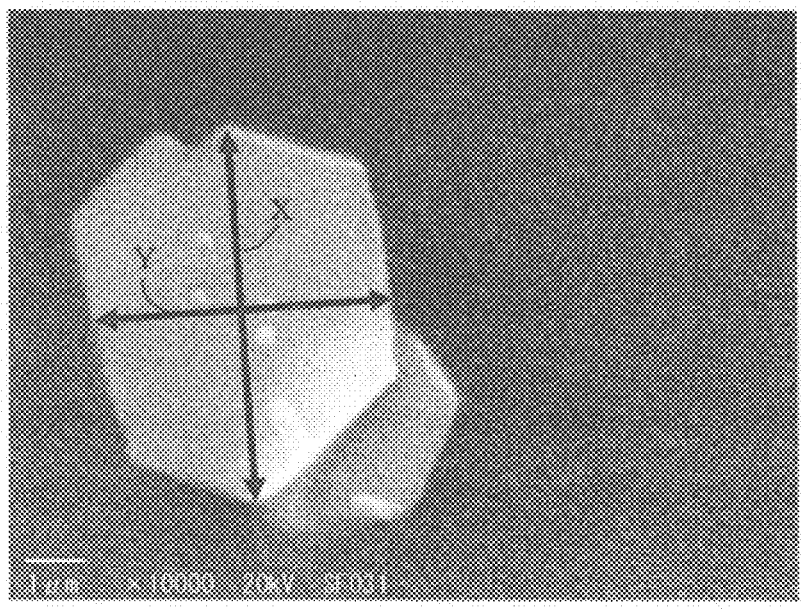
FIG. 11 is a photograph of a scanning type electron microscope (SEM) image of particles constituting the collecting layer.

As to the obtained honeycomb filter, there were evaluated, by the following methods, "the average long diameter of the plate-like particles (described as "the average long diameter" in Table 1)", "the average value of the values of the ratios of the long diameters to the short diameters of the plate-like particles (described as "the long diameters/the short diameters" in Table 1)", "the average values of the ratios of the long diameters to the thicknesses of the plate-like particles (described as "the long diameters/the thicknesses" in Table 1), "a percentage (%) of specific plate-like particles", "an open area ratio (%) of the surface of the collecting layer", "a porosity (%) of the collecting layer", "a thickness of the collecting layer/a thickness of each partition wall (%)", "an average pore diameter (μm) of the collecting layer", "a porosity (%) of a honeycomb base material", "an average pore diameter (μm) of the honeycomb base material", "an initial pressure loss (kPa)" and "a PM deposited pressure loss rise (%)". The results are shown in Table 1. The scanning type electron microscope (SEM) image of the particles forming the honeycomb filter is shown in FIG. 11.

(Average Long Diameter, Long Diameters/Short Diameters, and Long Diameters/Thicknesses)

"The average long diameter", "the long diameters/the short diameters" and "the long diameters/the thicknesses" of the collecting layer were obtained by the following method. The particles constituting the collecting layer were peeled from the surface of the collecting layer with a cellophane tape, and a scanning type electron microscope (SEM) image of the particles was acquired (e.g., see FIG. 11). The SEM image of FIG. 11 was an image of 1280×960 pixels. It is to be noted that a magnification of the SEM image can be set to an arbitrary magnification in accordance with a shape of particles. In FIG. 11, a length of an arrow denoted with a reference sign X indicates the length of "the long diameter", and a length of an arrow denoted with a reference sign Y indicates the length of "the short diameter".

Moreover, although not shown, in the measurement of the SEM image, a sample (a peeled particle) which became a measurement object was rotated, to further acquire the SEM image from a direction vertical to the surface of the plate-like particle, thereby measuring a length in a thickness direction.

From the SEM image, "the long diameters", "the short diameters" and "the thicknesses" of the particles were measured. Moreover, the values of "the long diameter/the short diameter" and "the long diameter/the thickness" were calculated for each of the particles. Furthermore, the average (mean) value of "the long diameters" of the respective particles was obtained as "the average long diameter". Moreover, the average (mean) value of the values of "the long diameters/the short diameters" of the respective particles was obtained as "the average value of the long diameters/the short diameters", and the average (mean) value of the values of "the long diameters/the thicknesses" of the respective particles was obtained as "the average value of the long diameters/the thicknesses". When the values were averaged, all the particles in the SEM image were used.

(Percentage of Specific Plate-Like Particles)

From the above SEM image of the collecting layer used in the measurement of the above "average long diameter", the number of all the particles in the SEM image and the number of the plate-like particles were obtained, and a percentage of the number of the plate-like particles to the number of all the particles (the number of the plate-like particles/the number of all the particles×100) was obtained as "the percentage (%) of the specific plate-like particles".

(Open Area Ratio of Surface of Collecting Layer)

"The open area ratio of the surface of the collecting layer" was obtained by the following method. First, an image of the surface of the collecting layer was picked up by using a laser microscope (e.g., "LEXT OLS4000 (trade name)" manufactured by OLYMPUS Co.), and a surface unevenness image of the surface was acquired. Next, a surface undulation of the surface unevenness image was removed by high pass filter ($\lambda=25$ μm) processing, and then binarization processing was performed by using "(a mode value of a height)−2 μm" as a threshold value. After the binarization processing, a region higher than the above threshold value was obtained as a partition wall material (i.e., a substantive part of the collecting layer), and a lower region was obtained as a pore part of the collecting layer. The areas of the substantive part of the collecting layer and the pore part of the collecting layer were calculated, respectively. From the obtained areas, the ratio of a pore area to the whole area (the pore area/the whole area× 100) was obtained as "the open area ratio (%) of the surface of the collecting layer".

(Porosity of Collecting Layer)

"The porosity of the collecting layer" was obtained by the following method. First, the honeycomb filter was buried in a resin (an epoxy resin) to fill pores of partition walls of the honeycomb filter with the resin. A scanning type electron microscope (SEM) image of a cross section of the honeycomb filter which was in a vertical direction to a cell longitudinal direction was acquired. A partition wall in the obtained SEM image was divided by a width of 5 μm from a partition wall center (the center in a thickness direction) to a surface layer in the image (by image analysis), and each "divided part (divided region)" was subjected to the following processing. An area of the partition walls of each divided part was measured by using image analysis software ("Image-Pro Plus 6.2J (trade name)" manufactured by Media Cybernetics Co.). Here, a value obtained by subtracting "the area of the partition walls" from "the whole area" became "the area of pores (fine pores)". In the divided part closest to the surface, a percentage of "the area of the pores (the fine pores)" to "the whole area" (i.e., {1−"the area of the partition walls"/"the whole area"}× 100) was obtained as "the porosity (%) of the collecting layer".

(Thickness of Collecting Layer/Thickness of Partition Wall)

"The thickness of the collecting layer/the thickness of the partition wall" was obtained by the following method. First, the thickness of the collecting layer was calculated on the basis of the porosity in each image divided by the width of 5 μm in the above method of measuring the porosity of the collecting layer. Specifically, an average value of "the porosity in the partition wall center" and "the porosity in the divided part of the partition wall which was closest to the surface (the collecting layer)" was calculated, and a distance to the surface of the partition wall from a part from which an image where the calculated average value became equal to the porosity was picked up was obtained as the thickness (L1) of the collecting layer. The thickness (L2) of the partition wall was obtained from the scanning type electron microscope (SEM) image of a partition wall cross section. A ratio (L1/L2×100) of "the thickness (L1) of the collecting layer" to the obtained "thickness (L2) of the partition wall" was obtained as "the thickness of the collecting layer/the thickness of the partition wall (%)".

(Average Pore Diameter of Collecting Layer)

"The average pore diameter of the collecting layer" was obtained by the following method. A partition wall part (a plate part) of a honeycomb base material (which was not provided with the collecting layer) for use in the honeycomb filter was cut so that the surface of the part had a size of 30 mm×30 mm. On the surface of one side of the cutout plate, a precursor of the collecting layer having a thickness of 10 to 30 μm is formed by using the same material as a material constituting the collecting layer of the honeycomb filter. The precursor of the collecting layer was fired together with the cutout plate, to prepare an evaluation sample for measuring the average pore diameter. The average pore diameter (μm) of this evaluation sample was measured by a bubble point/half dry process by use of Perm Porometer ("Capillary Flow Porometer (trade name)" manufactured by PMI Co.). The obtained average pore diameter was "the average pore diameter (μm) of the collecting layer".

(Porosity of Honeycomb Base Material)

The collecting layer was removed from the partition wall of the honeycomb structure, and the porosity (%) was measured by mercury porosimetry by use of Auto Pore IV9520 (trade name) manufactured by Shimadzu Corp.

(Average Pore Diameter of Honeycomb Base Material)

The collecting layer was removed from the partition wall of the honeycomb structure, and the average pore diameter (μm) was measured by the mercury porosimetry by use of Auto Pore IV9520 (trade name) manufactured by Shimadzu Corp.

(Initial Pressure Loss)

A partition wall was cut out from each of "the plugged honeycomb structures" prepared with the same conditions as in examples and comparative examples so that it was possible to acquire an evaluation region of 10 mm×10 mm or larger and 50 mm×50 mm or smaller. Then, each of collecting layer forming raw materials prepared with the same conditions as in the examples and comparative examples was attached to one surface of the cutout partition wall, to prepare a precursor of the collecting layer. Afterward, the firing was performed on the same conditions as in Example 1, to obtain the sample for the evaluation. The obtained evaluation sample was installed in "a PM collecting efficiency measuring apparatus" so that the surface of the collecting layer (the surface layer) became "a gas inflow-side surface".

The PM collecting efficiency measuring apparatus includes a main body to which the evaluation sample is attached, a PM generating device is disposed on an upstream side of the main body, and the apparatus is configured to supply, to the main body, a PM generated by this PM generating device. The evaluation sample is attached so as to divide (partition) the interior of the main body into the upstream side and a downstream side. Moreover, in the main body, measuring holes are made in the evaluation sample on the upstream side and the downstream side. Pressures on the upstream and downstream sides of the evaluation sample can be measured through the measuring holes, respectively.

When an initial pressure loss (kPa) is measured, air is supplied to the main body in a state where the PM is not generated. Specifically, the air which does not contain the PM is supplied to the main body, and passed through the evaluation sample. At this time, a flow velocity (a permeation flow velocity) when the air which does not contain the PM permeates the evaluation sample is adjusted to an arbitrary point of 30 cm/second or higher and 2 m/second or lower. Then, a difference between the pressure measured through the upstream-side measuring hole and the pressure measured through the downstream-side measuring hole is the initial pressure loss (kPa).

(PM Deposited Pressure Loss Rise)

In the same manner as in the above measuring of the "initial pressure loss", the permeation of the PM-containing air through the evaluation sample is performed by using "the PM collecting efficiency measuring apparatus". Then, a value obtained by subtracting the initial pressure loss from a value of a difference between the pressure measured through the upstream-side measuring hole and the pressure measured through the downstream-side measuring hole when 0.03 mg of the PM is deposited per square centimeter of the evaluation sample is a PM deposited pressure loss rise (kPa).

Examples 2 to 12

Plugged honeycomb structures were prepared in the same manner as in Example 1, and honeycomb filters were prepared in the same manner as in Example 1, except that raw materials (collecting layer raw material powder) to form collecting layers shown in Table 1 and Table 2 were used. It is to be noted that in Examples 4 and 10, talc powder was used as the collecting layer raw material powder. In Example 5, kaolin powder was used as the collecting layer raw material powder. In Example 12, alumina powder was used as the collecting layer raw material powder. In Examples 2, 3, 6 to 9 and 11, boehmite powder was used as the collecting layer raw material powder. The boehmite powder was fired to form a collecting layer made of alumina. Evaluations were performed in the same manner as in Example 1. The results are shown in Table 1 and Table 2.

TABLE 1

|  | Example 1 | Example 2 | Example 3 | Example 4 | Example 5 | Example 6 | Example 7 |
|---|---|---|---|---|---|---|---|
| Honeycomb base material | Cordierite | Cordierite | Cordierite | Cordierite | Cordierite | Cordierite | Cordierite |
| Collecting layer (surface layer) | Alumina | Alumina | Alumina | Talc | Kaolin | Alumina | Alumina |
| Coating method | Dry type | Dry type | Dry type | Dry type | Dry type | Dry type | Dry type |
| Ave. long dia. | 8 μm | 0.3 μm | 3 μm | 7 μm | 3 μm | 3 μm | 3 μm |
| Long dia./short dia. | 1.5 | 1.1 | 2.0 | 1.6 | 1.2 | 1.3 | 1.3 |
| Long dia./thickness | 40 | 8.2 | 20 | 3.8 | 3.5 | 20 | 20 |
| Percentage of specific plate-like particles | 90% | 75% | 90% | 60% | 55% | 90% | 90% |
| Open area ratio of surface of collecting layer | 22% | 23% | 36% | 16% | 20% | 32% | 32% |
| Porosity of collecting layer | 80% | 69% | 76% | 72% | 58% | 83% | 83% |
| Thickness of collecting layer/thickness of partition wall | 14% | 14% | 14% | 14% | 14% | 5% | 3% |
| Ave. pore dia. of collecting layer | 2.8 μm | 0.9 μm | 2.6 μm | 2.1 μm | 2.2 μm | 2.6 μm | 2.6 μm |
| Porosity of honeycomb base material | 46% | 46% | 46% | 46% | 46% | 46% | 46% |
| Ave. pore dia. of honeycomb base material | 12 μm | 12 μm | 12 μm | 12 μm | 12 μm | 12 μm | 12 μm |
| Raw material powder | Alumina | Boehmite | Boehmite | Talc | Kaolin | Boehmite | Boehmite |
| Ave. long dia. of raw material | 8 μm | 0.3 μm | 3 μm | 7 μm | 3 μm | 3 μm | 3 μm |
| Long dia./short dia. of raw material | 1.5 | 1.1 | 2.0 | 1.6 | 1.3 | 1.3 | 1.3 |
| Long dia./thickness of raw material | 40 | 8.2 | 20 | 3.8 | 5.1 | 20 | 20 |
| Percentage of non plate-like particles | 5% | 5% | 5% | 5% | 9% | 5% | 5% |
| Initial pressure loss (kPa) | 2.2 | 3.0 | 1.9 | 2.3 | 3.3 | 1.2 | 1.2 |
| PM deposited pressure loss rise (kPa) | 1.5 | 1.1 | 1.3 | 1.9 | 1.7 | 2.5 | 3.1 |

TABLE 2

|  | Example 8 | Example 9 | Example 10 | Example 11 | Example 12 | Example 13 | Example 14 |
|---|---|---|---|---|---|---|---|
| Honeycomb base material | Cordierite | Cordierite | Cordierite | Cordierite | Cordierite | Cordierite | Cordierite |
| Collecting layer (surface layer) | Alumina | Alumina | Talc | Alumina | Alumina | Alumina | Alumina |
| Coating method | Dry type | Dry type | Dry type | Dry type | Dry type | Dry type | Dry type |
| Ave. long dia. | 3 μm | 3 μm | 7 μm | 0.3 μm | 7 μm | 3 μm | 5 μm |
| Long dia./short dia. | 1.3 | 1.3 | 1.6 | 1.1 | 1.8 | 1.3 | 1.9 |
| Long dia./thickness | 20 | 20 | 12 | 6.3 | 30 | 20 | 17 |
| Percentage of specific plate-like particles | 90% | 90% | 90% | 60% | 90% | 90% | 75% |
| Open area ratio of surface of collecting layer | 32% | 32% | 24% | 13% | 31% | 32% | 29% |
| Porosity of collecting layer | 83% | 83% | 73% | 66% | 78% | 83% | 81% |
| Thickness of collecting layer/thickness of partition wall | 29% | 33% | 14% | 14% | 14% | 14% | 14% |
| Ave. pore dia. of collecting layer | 2.6 μm | 2.6 μm | 4.5 μm | 0.4 μm | 5.3 μm | 2.6 μm | 2.5 μm |
| Porosity of honeycomb base material | 46% | 46% | 46% | 46% | 46% | 58% | 46% |
| Ave. pore dia. of honeycomb base material | 12 μm | 12 μm | 12 μm | 12 μm | 12 μm | 54 μm | 12 μm |
| Raw material powder | Boehmite | Boehmite | Talc | Boehmite | Alumina | Boehmite | Composite particles |
| Ave. long dia. of raw material | 3 μm | 3 μm | 7 μm | 0.3 μm | 7 μm | 3 μm | 5 μm |
| Long dia./short dia. of raw material | 1.3 | 1.3 | 1.6 | 1.1 | 1.8 | 1.3 | 2.1 |
| Long dia./thickness of raw material | 20 | 20 | 12 | 8.2 | 30 | 20 | 20 |
| Percentage of non plate-like particles | 5% | 5% | 5% | 8% | 5% | 5% | 8% |
| Initial pressure loss (kPa) | 2.3 | 2.9 | 1.6 | 3.3 | 1.4 | 2.0 | 1.8 |
| PM deposited pressure loss rise (kPa) | 1.0 | 1.0 | 2.1 | 1.6 | 2.6 | 1.4 | 1.5 |

Example 13

A honeycomb structure was prepared in the same manner as in Example 1 except that polymethyl methacrylate (PMMA) having an average particle diameter of 60 μm was further added to a ceramic forming raw material and that boehmite was used as collecting layer raw material powder. A content of PMMA in the ceramic forming raw material was 10 mass %. Evaluations were performed in the same manner as in Example 1. The results are shown in Table 2.

Example 14

A honeycomb structure was prepared in the same manner as in Example 1 except that composite plate-like particles (described as "composite particles" in Table 1) obtained by coating alumina particles having an average long diameter of 5 μm, an average value of long diameters/short diameters which was 2 and an average value of the long diameters/thicknesses which was 20 with a slurry obtained by mixing 60 g of ceria sol containing 15 mass % of $CeO_2$, 20 g of alumina sol containing 20 mass % of $Al_2O_3$ and 4 g of aqueous platinum chloride solution containing 10 mass % of Pt were used as a raw material to form a collecting layer (collecting layer raw material powder) by use of a powder coating device. It is to be noted that Spira Flow (trade name) manufactured by Freund Industries Co. was used as the powder coating device. As to a coating amount, the alumina particles were coated so that a platinum content ratio became 0.5 mass %. Evaluations were performed in the same manner as in Example 1. The results are shown in Table 2.

Comparative Examples 1 to 3, 5 and 6

Plugged honeycomb structures were prepared in the same manner as in Example 1, and honeycomb filters were prepared in the same manner as in Example 1, except that a raw material to form a collecting layer (collecting layer raw material powder) shown in Table 3 was used. It is to be noted that in Comparative Examples 1, 5 and 6, boehmite powder was used as the collecting layer raw material powder, and in Comparative Examples 2 and 3, alumina powder was used as the collecting layer raw material powder. The boehmite powder was fired to form a collecting layer made of alumina. Evaluations were performed in the same manner as in Example 1. The results are shown in Table 3.

Comparative Example 4

A plugged honeycomb structure was prepared in the same manner as in Example 1. As a raw material to form a collecting layer, 900 g of water was added to 230 g of boehmite having an average long diameter of 3 μm, an average value of long diameters/short diameters which was 1.3 and an average value of the long diameters/thicknesses which was 10, and the obtained mixed solution was mixed with a homogenizer to prepare a collecting layer forming slurry. The surface of a partition wall parent material in cells (inflow cells) of the plugged honeycomb structure was dip-coated with the obtained collecting layer forming slurry (i.e., coated by a wet process), to form a precursor of the collecting layer. The plugged honeycomb structure provided with the precursor of the collecting layer was dried at 120° C., and fired by heating at 1000 to 1300° C. for two hours, to obtain a honeycomb filter. Evaluations were performed in the same manner as in Example 1. The results are shown in Table 3.

TABLE 3

|  | Comparative Example 1 | Comparative Example 2 | Comparative Example 3 | Comparative Example 4 | Comparative Example 5 | Comparative Example 6 |
| --- | --- | --- | --- | --- | --- | --- |
| Honeycomb base material | Cordierite | Cordierite | Cordierite | Cordierite | Cordierite | Cordierite |
| Collecting layer (surface layer) | Alumina | Alumina | Alumina | Alumina | Alumina | Alumina |
| Coating method | Dry type | Dry type | Dry type | Wet type | Dry type | Dry type |
| Ave. long dia. | 0.6 μm | 7 μm | 12 μm | 3 μm | 3 μm | 0.1 μm |
| Long dia./short dia. | 1.1 | 1.2 | 2.0 | 1.3 | 1.2 | 1.1 |
| Long dia./thickness | 1.3 | 1.4 | 5.5 | 10 | 2.7 | 3.2 |
| Percentage of specific plate-like particles | 1% | 1% | 35% | 90% | 40% | 25% |
| Open area ratio of surface of collecting layer | 15% | 18% | 11% | 8% | 19% | 10% |
| Porosity of collecting layer | 67% | 53% | 76% | 75% | 55% | 57% |
| Thickness of collecting layer/thickness of partition wall | 14% | 14% | 14% | 14% | 14% | 14% |
| Ave. pore dia. of collecting layer | 0.9 μm | 5.8 μm | 1.8 μm | 1.3 μm | 2.2 μm | 0.5 μm |
| Porosity of honeycomb base material | 46% | 46% | 46% | 46% | 46% | 46% |
| Ave. pore dia. of honeycomb base material | 12 μm | 12 μm | 12 μm | 12 μm | 12 μm | 12 μm |
| Raw material powder | Boehmite | Alumina | Alumina | Boehmite | Boehmite | Boehmite |
| Ave. long dia. of raw material | 0.6 μm | 7 μm | 12 μm | 3 μm | 3 μm | 0.1 μm |
| Long dia./short dia. of raw material | 1.1 | 1.3 | 2.0 | 1.3 | 1.3 | 1.1 |
| Long dia./thickness of raw material | 1.4 | 1.5 | 5.5 | 10 | 3.8 | 3.2 |
| Percentage of non plate-like particles | 5% | 5% | 5% | 5% | 12% | 1% |
| Initial pressure loss (kPa) | 6.3 | 2.0 | 5.5 | 6.1 | 4.1 | 5.5 |
| PM deposited pressure loss rise (kPa) | 1.4 | 3.5 | 1.8 | 2.0 | 2.0 | 1.8 |

As shown in Table 1 to Table 3, the honeycomb filters of Examples 1 to 14 have a low initial pressure loss, and a suppressed PM deposited pressure loss rise. In Comparative Example 6 in which the average long diameter of the plate-like particles constituting the collecting layer is smaller than 0.2 μm (specifically, the average long diameter is 0.1 μm) and Comparative Example 3 in which the average long diameter of the plate-like particles is 10 or larger (specifically, the average long diameter is 12.0 μm), the initial pressure loss increases. Moreover, in Comparative Examples 1 and 2 in which "the long diameters/the thicknesses" are smaller than 3 (specifically, "the long diameters/the thicknesses" are 1.4 and 1.5, respectively), the initial pressure loss or the PM deposited pressure loss rise increases as compared with the other examples.

Moreover, in Comparative Example 4, the collecting layer is formed by a wet process (i.e., the dip coating by use of the slurry). Therefore, the open area ratio of the surface of the collecting layer is smaller than 10% (specifically, 8%), and the initial pressure loss becomes large. Moreover, in Comparative Example 5, raw material powder in which the percentage of the non plate-like particles is over 10% (specifically, the percentage is 12%) is used during manufacturing. Therefore, small and substantially spherical non plate-like particles penetrate into the pores of the partition wall parent material to clog the pores.

Furthermore, in the honeycomb filters of Examples 1 to 14, when "the percentage of the specific plate-like particles" is higher, a tendency to suppress the initial pressure loss is confirmed (e.g., Examples 5, 2 and 4). Moreover, when "the porosity of the collecting layer" increases, the tendency to suppress the initial pressure loss is confirmed (e.g., Examples 5, 2 and 3). Furthermore, when "the thickness of the collecting layer/the thickness of the partition wall" is smaller, the effect of the collecting layer is not easily obtained, and the PM deposited pressure loss rise tends to become large (e.g., Examples 6 and 7). When "the thickness of the collecting layer/the thickness of the partition wall" becomes larger, the initial pressure loss tends to increase (e.g., Examples 8 and 9). Moreover, when the "the average pore diameter of the collecting layer" is smaller, the initial pressure loss tends to increase (e.g., Examples 2 and 11). When "the average pore diameter of the collecting layer" is larger, the PM deposited pressure loss rise tends to become large (e.g., Examples 10 and 12).

A honeycomb filter of the present invention can suitably be utilized as a filter to purify gases discharged from an internal combustion engine such as a diesel engine, various types of combustion apparatuses and the like. Moreover, a manufacturing method of a honeycomb filter of the present invention can suitably be utilized in manufacturing such a honeycomb filter.

DESCRIPTION OF REFERENCE SIGNS

1: partition wall parent material, 2: cell, 2a: inflow cell, 2b: outflow cell, 3: outer peripheral wall, 4: honeycomb base material, 5: plugged portion, 11: inflow-side end surface, 12: outflow-side end surface, 13: collecting layer, 14: particle, 14a: plate-like particle, 15: surface (the surface of the collecting layer), 16: surface (the surface of the plate-like particle), 17: long diameter of plate-like particle, 18: short diameter of plate-like particle, 19: thickness of plate-like particle, 21: surface layer, 22: deep layer, 23: partition wall, 50: honeycomb formed body, 51: non-fired partition wall parent material, 52: cell, 52a: inflow cell, 52b: outflow cell, 53: outer peripheral wall, 55: plugged portion, 60: plugged honeycomb formed body, 61: inflow-side end surface, 62: outflow-side end surface, 70: plugged honeycomb structure, 71: partition wall parent material, 72: cell, 72a: inflow cell, 72b: outflow cell, 73: outer peripheral wall, 74: honeycomb base material, 75: plugged portion, 80: plugged honeycomb structure with non-fired collecting layer, 83: non-fired collecting layer, 84: powder, 100: honeycomb structure, L1: thickness of collecting layer, L2: thickness of partition wall, and L3: thickness of deep layer.

What is claimed is:

1. A honeycomb filter comprising: a honeycomb base material including a porous partition wall parent material to partition and form a plurality of cells which become through channels of a fluid; plugged portions arranged in open frontal areas of predetermined cells in an end surface on an inflow side of the fluid and open frontal areas of the remaining cells in an end surface on an outflow side of the fluid; and a porous collecting layer disposed on the surface of the partition wall parent material in at least the remaining cells, wherein
    the collecting layer has a constitution in which a plurality of particles combine or intertwine with one another,
    the collecting layer includes flat plate-like particles as the plurality of particles, the plurality of particles are particles in which an average particle long diameter is 0.2 μm or larger and smaller than 10 μm, an average value of ratios (long diameters/short diameters) of the long diameters to the short diameters of the respective particles is smaller than 3, and an average value of ratios (the long diameters/thicknesses) of the long diameters to thicknesses of the respective particles is 3 or larger, and
    an open area ratio of the surface of the collecting layer is 10% or larger.

2. The honeycomb filter according to claim 1, wherein the plurality of particles include 60% or more of specific plate-like particles having long diameters of 0.2 μm or larger and smaller than 10 μm, an average value of the ratios (the long diameters/the short diameters) of the long diameters to the short diameters which is smaller than 3, and an average value of the ratios (the long diameters/the thicknesses) of the long diameters of the thicknesses which is 3 or larger, in the number of all the particles constituting the collecting layer.

3. The honeycomb filter according to claim 1, wherein in the plurality of particles, a percentage of particles having the long diameters/the short diameters of 3 or larger and the long diameters/the thicknesses of 3 or larger in the number of all the particles constituting the collecting layer is smaller than 0.1%.

4. The honeycomb filter according to claim 1, wherein a porosity of the collecting layer is from 60 to 95%.

5. The honeycomb filter according to claim 1, wherein a thickness of the collecting layer is from 5 to 30% of a thickness of each of partition walls including the partition wall parent material and the collecting layer disposed on the partition wall parent material.

6. The honeycomb filter according to claim 1, wherein an average pore diameter of the collecting layer is from 0.5 to 5 μm.

7. The honeycomb filter according to claim 1, wherein in the honeycomb base material, an average pore diameter of the partition wall parent material is from 10 to 60 μm, and a porosity of the partition wall parent material is from 40 to 70%.

8. The honeycomb filter according to claim 1, wherein the plurality of particles are particles containing, as a main component, at least one selected from the group consisting of talc, kaolin, mica, alumina, silica, zirconia, titania, ceria, magnesia, cordierite, and mullite.

9. The honeycomb filter according to claim 1, wherein the plate-like particles include composite plate-like particles formed by coating at least one selected from the group consisting of plate-like ceramic particles, graphite, and glass flakes with ceramic particles or sol.

10. The honeycomb filter according to claim 1, wherein the collecting layer is also disposed on the surface of the partition wall parent material in the predetermined cells.

* * * * *

UNITED STATES PATENT AND TRADEMARK OFFICE
CERTIFICATE OF CORRECTION

PATENT NO. : 8,747,508 B2
APPLICATION NO. : 13/420774
DATED : June 10, 2014
INVENTOR(S) : Yoshinori Isoda and Yoshio Kikuchi It is certified that error appears in the above-identified patent and that said Letters Patent is hereby corrected as shown below:

On the Title Page Item (56) Other Publications

Please correct: "Yukio Mizuno et al., *"Study on Wall Pore Structure for Next Generation Diesel Particulate Filter,"* SAE Technical Paper 2008-01-0921 ,Society of Automotive Engineers, 2008, pp. 289-298." to -- Yukio Mizuno et al., *"Study on Wall Pore Structure for Next Generation Diesel Particulate Filter,"* SAE Technical Paper 2008-01-0618, Society of Automotive Engineers, 2008, pp. 289-298. --

Signed and Sealed this
Seventh Day of October, 2014

Michelle K. Lee
*Deputy Director of the United States Patent and Trademark Office*